US005457476A

United States Patent [19]
Jenson

[11] Patent Number: 5,457,476
[45] Date of Patent: Oct. 10, 1995

[54] METHOD FOR CONTROLLING A COMPUTERIZED ORGANIZER

[75] Inventor: Scott A. Jenson, Redwood City, Calif.

[73] Assignee: Apple Computer, Inc., Cupertino, Calif.

[21] Appl. No.: 68,523

[22] Filed: May 27, 1993

Related U.S. Application Data

[63] Continuation-in-part of Ser. No. 57,101, May 3, 1993, and a continuation-in-part of Ser. No. 889,470, May 27, 1992.

[51] Int. Cl.$^6$ ................................................. G09G 5/00
[52] U.S. Cl. ................................................. 345/146
[58] Field of Search .................................. 345/146

[56] References Cited

U.S. PATENT DOCUMENTS

| | | | |
|---|---|---|---|
| 5,050,105 | 9/1991 | Peters | 364/521 |
| 5,063,600 | 11/1991 | Norwood | 382/13 |
| 5,070,470 | 12/1991 | Scully et al. | 364/705.08 |
| 5,129,057 | 7/1992 | Strope et al. | 395/161 |
| 5,247,438 | 9/1993 | Subas et al. | 364/400 |
| 5,307,086 | 4/1994 | Griffin et al. | 345/146 |

OTHER PUBLICATIONS

"Apple Banking on Newton's Brain" (O'Connor) San Jose Mercury News, Apr. 22, 1992.
"A Step toward the Future" (Weiman et al) Macworld, Aug. 1992, pp. 129–131.
"Your World According to Newton" (Soviero) Popular Science, Sep. 1992, pp. 45–49.
"From the Editor" (Abatemarco) Popular Science, Sep. 1992, p. 4.
Polaris software advertisement, PC Magazine, 1992.
"Ascend: Windows PIM Follows Strict Time–Management Philosophy" (Keith) PC Magazine, Mar. 31, 1992.
Sharp Electronic Organizer Model ZQ–5000/ZQ–5200 Operation Manual (Sharp Electronics Corp 1990).
Research Disclosure, Feb. 1993, 346101.
Research Disclosure, Aug. 1991, 32827.

*Primary Examiner*—Jeffery Brier
*Attorney, Agent, or Firm*—Hickman & Beyer

[57] ABSTRACT

The method of the present invention includes the steps of executing a process to support a number of temporal-based functions and activating at least one of these temporal-based functions. Temporal-based functions of the present invention include a scheduler, to-do list, and a note function. Temporal-based entries can then be moved within and/or between the temporal-based functions. Further, temporal-based entries can be edited for each temporal-based function. Moving temporal-based entries involves the selection of an entry with a pointer mechanism, dragging the entry to a new location, releasing the entry at the new location, and updating a database to reflect the entry's change in position. Editing an entry involves direct editing of an entry, editing through an editing window, or editing of a duration bar associated with an entry. Data entered into a scheduling field of the scheduler function is processed according to its placement within the scheduling field. Annotation entries are separated from appointment entries by an invisible margin in the scheduling field.

31 Claims, 22 Drawing Sheets

|  | August 1993 |
|---|---|
| Thursday, Aug 5 | s  m  t  w  t  f  s |
| | 1  2  3  4  5  6  7 |
| go to store | 8  9  10  11  12  13  14 |
| | 15  16  17  18  19  20  21 |
| | 22  23  24  25  26  27  28 |
| | 29  30  31 |

9 ..........................................

10 ................................ bring donuts

11 ▮ Meet Jenson ⌐ 80 .......................

12 ..........................................

1 ⌐ 84 .....................................

2 ..........................................

3 ..........................................

4 ..........................................

5 ..........................................

[ A ✎ ] [ To Do List ] [ Today ]   [✉] [✕]

*Fig. 6*

METHOD FOR CONTROLLING A COMPUTERIZED ORGANIZER

CROSS-REFERENCE TO RELATED APPLICATIONS

This application is a continuation-in-part of co-pending U.S. patent application Ser. No. 8/057,101 filed May 3, 1993 on behalf of Jenson and entitled Schedule and To-Do List for a Pen-Based Computer System, and is also a continuation-in-part of co-pending U.S. patent application Ser. No. 07/889,470 filed May 27, 1992 on behalf of Jenson et al. and entitled Method and Apparatus for Controlling a Scheduler, both of which are assigned to the assignee of the present invention, and the disclosures of which are hereby incorporated herein by reference in their entirety.

BACKGROUND OF THE INVENTION

The present invention relates generally to computerized calendars and to-do lists and more particularly to calendars and to-do lists used on electronic personal organizers and pen-based computer systems.

Computerized personal organizers are becoming increasingly popular with a large segment of the population. Computerized personal organizers tend to be small, lightweight, and relatively inexpensive, and can perform such functions as keeping a calendar, an address and telephone book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a union of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Besides serving as a notepad, pen-based computers can provide a number of useful functions, such as provided in a personal organizer. Two of the most frequently used functions of a personal organizer are the daily calendar (or schedule) and the to-do list. A user typically selects a schedule or to-do date by means of a keyboard entry or other select button.

A problem with schedules and to-do lists of the prior art is that their user interface tends to be awkward. Personal organizers often require a number of keystrokes to enter the date or range of dates to be viewed. Even computers with windowing systems tend to be awkward because they present the user with a controller in one window and a display in another window. When in the controller window, the user is locked out of the schedule display window and vice versa. Furthermore, the schedule control window is often displayed on top of the schedule display window, thereby obscuring the schedule information. This two window, modal (i.e. only one window is active at a time) system makes it difficult to easily traverse and browse through the schedule or to-do information.

Calendars, to-do lists, and notepad applications of the prior art are also not always tightly integrated. They may have different user interfaces, requiring more learning on the part of a user, and increasing the chance of user error. Also, if they are not integrated, a user will have to go through the time-consuming process of exiting one application program and starting another to change from one function to another. Furthermore, non-integrated application programs often have problems communicating with each other, thereby often requiring the duplicative entry of data.

In view of the foregoing, it would be desirable to have an integrated scheduler, to-do list, and note area to allow convenient modification of entries. Such convenient modifications would include the transfer of entries to, from, and between each day, and to, from, and between the scheduler, to-do list and note area.

SUMMARY OF THE INVENTION

To achieve the foregoing and other objects and in accordance with the purpose of the present invention, a method for controlling a computerized organizer is described. In general, the method includes the steps of executing a process to support a number of temporal-based functions and activating at least one of these temporal-based functions. Temporal-based functions of the present invention include a scheduler, to-do list, and a note function. Temporal-based entries can then be moved within and/or between the temporal-based functions. Further, temporal-based entries can be edited for each temporal-based function.

A method for moving temporal-based entries in accordance with the present invention includes first selecting the temporal-based entry to be moved with a pointer mechanism. The temporal-based entry is then dragged across a screen with the pointer mechanism and released at a new location on the screen. The temporal value associated with the temporal-based entry is then updated to reflect the move to the new position. Temporal values for an entry can include a start time, a stop time, and a date stamp. With this method, changing the position of an entry converts a note entry to a schedule entry or to a to-do entry, and vice versa. When multi-day views of the organizer are displayed, the entries are easily reorganized by simply moving the entries into a new day and/or time location.

A method for editing temporal-based entries in a computerized organizer also provides convenient and simple editing of the temporal entries. A title, duration, start time, or stop time can be altered by the editing method of the present invention. One form of editing includes direct editing of entries by writing new data to the screen or deleting data from the screen with the use of the pointer mechanism. Another form of editing includes displaying an editing window upon the selection of a duration bar associated with the entry. The editing window allows the user to enter a new start time or a new title, or an additional annotation, either textual or graphical, as desired for an entry. The duration of an entry can also be altered by simply changing the length of the entry's duration bar by dragging the pointer along the duration bar.

A method for entering data into a scheduler in accordance with the present invention includes the steps of displaying a scheduling field, entering data into the scheduling field with a pointer mechanism, and processing the data according to its placement on the screen. The scheduling field contains an appointment area and an annotation area separated by an invisible margin. Therefore, data to be entered is processed by determining on which side of the margin it has substantially been placed. Data entered on one side of the margin is treated as an annotation while data on the other side of the margin is treated as an appointment. Appointments, unlike annotations, are given a start time, stop time, and duration as appropriate for the entry.

By the methods of the present invention, modifying data in a personal organizer is convenient and practical. Users can adjust entries as needed to reflect the common rearrangements of daily schedules and to-do lists with the convenience of moving entries within a single day or between days. Provision of an editing window not only allows easy alterations to the display of entries but also allows extra information, such as a map providing directions to a meeting or a phone number for calling, to be annotated to an entry. Thus, information can be easily stored and conveniently modified.

These and other advantages of the present invention will become apparent upon reading the following detailed descriptions and studying the various figures of the drawings.

BRIEF DESCRIPTION OF THE DRAWINGS

FIGS. 3a, 3b, and 4–13 are twelve views of the output screen of the computer system of the present invention when under the control of the process of the present invention;

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
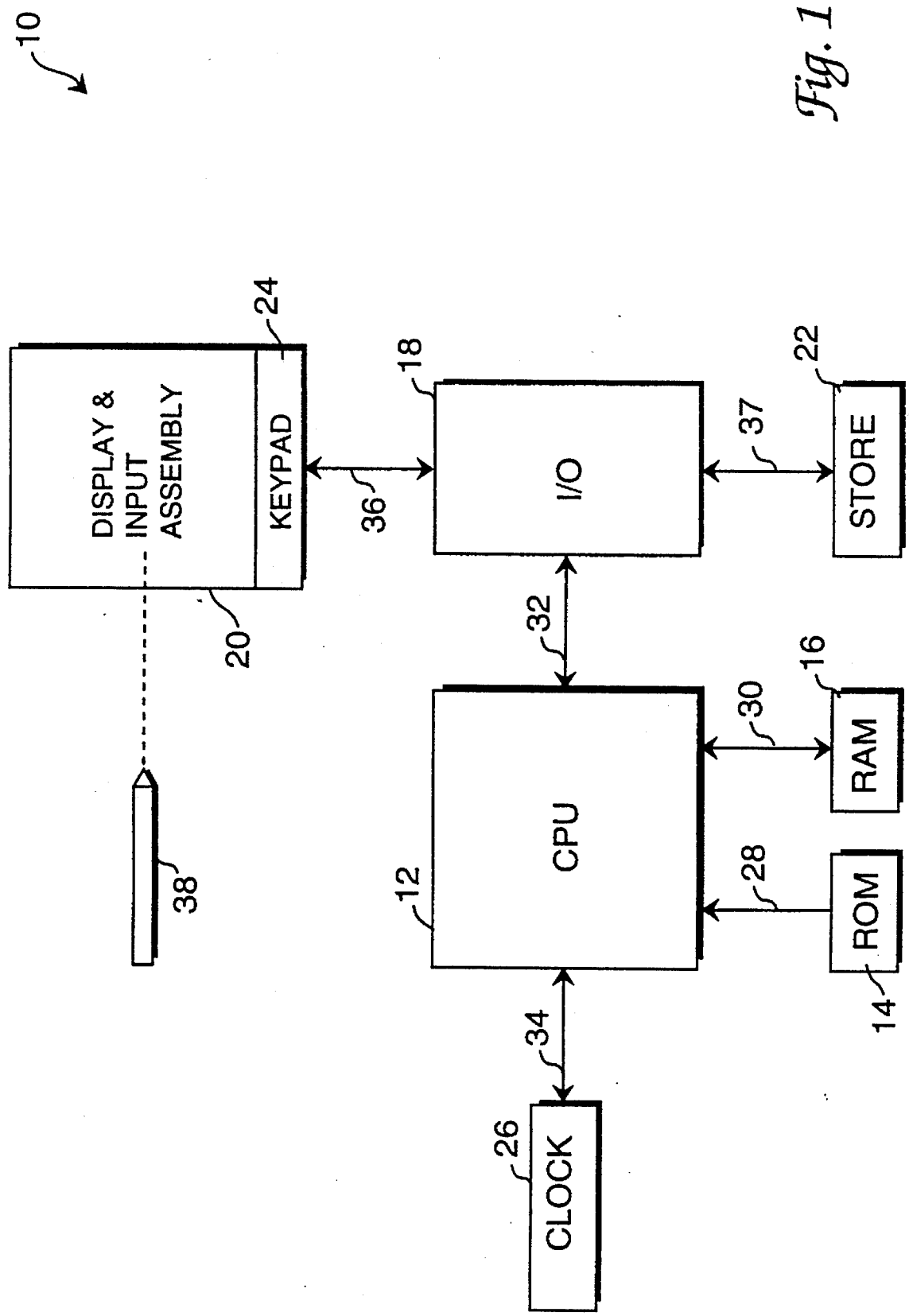
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 preferably comprises a real-time clock to provide real-time information to the system 10. Clock 26 is coupled to CPU 12 by a data bus 34.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. With such a structure, the display assembly 20 can serve as an input "tablet." These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons associated with the bottom edge of the membrane which covers the LCD display. When the buttons are depressed, the membrane senses the pressure and communicates that fact to the CPU 12 via data bus 36 and I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via data bus 36 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
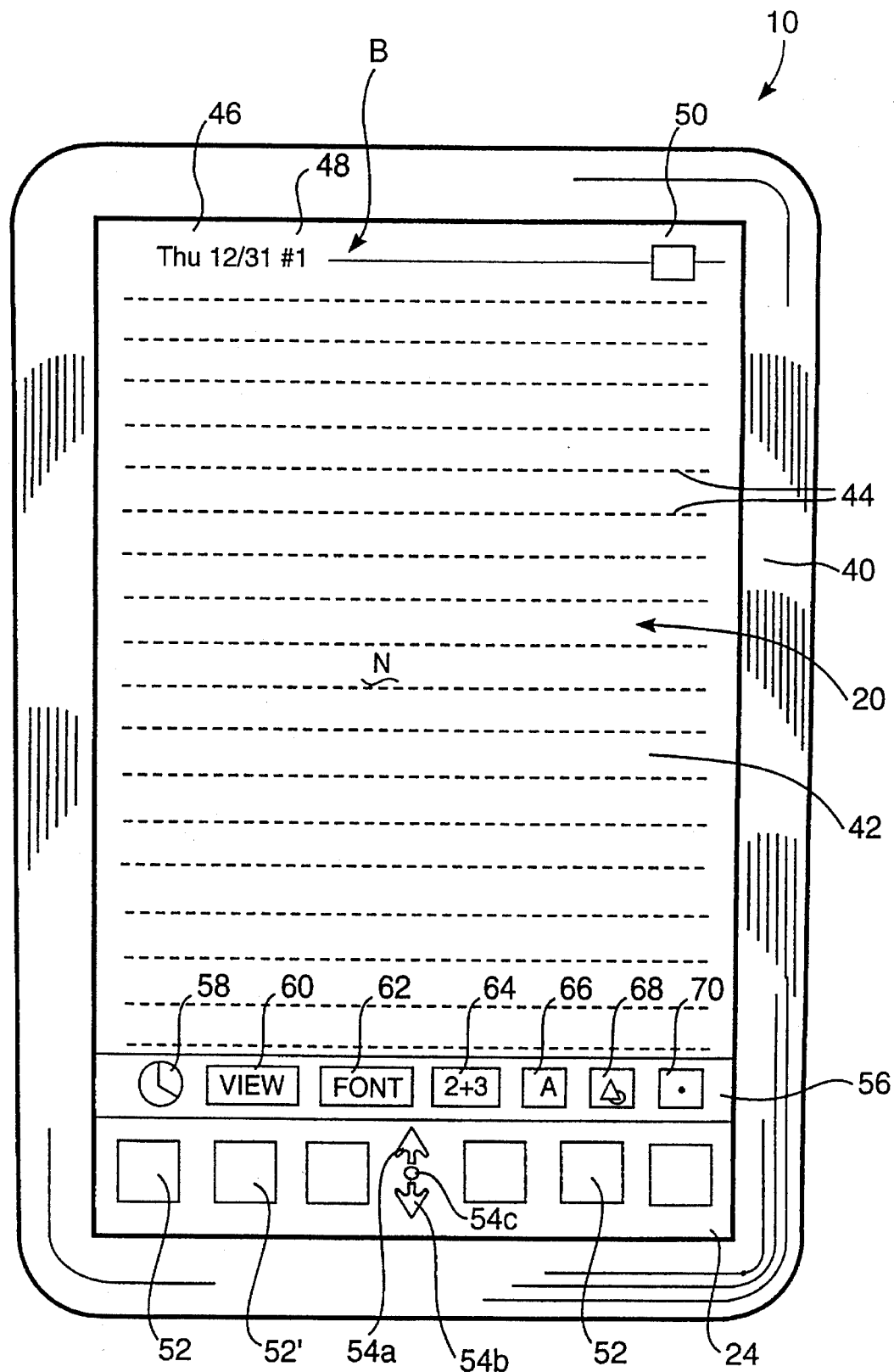
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al., entitled "Method for Manipulating Notes on a Computer Display", now U.S. Pat. No. 5,398,310, assigned to the assignee of the present invention and incorporated herein by reference in its entirety. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, an equations button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

One of the buttons 52 of the keypad 24 is preferably dedicated to "date" type functions, including a calendar or schedule (herein referred to as "schedule" to prevent confusion with the calendar controller) function and a to-do function. This dedicated button 52 (known hereafter as the "date button") is labeled 52' in FIG. 2. When date button 52' is pressed, the schedule/to-do navigation process of the present invention is activated.

A preferred data structure for use in the present invention is known as a "frame" system, which is a form of semantic network. As is well known to those skilled in the art, a semantic network is a knowledge representation system where unary predicates are treated like types and binary predicates are treated like attributes. Further, the types are arranged in a taxonomy where sub-assumption holds. Frame systems in accordance with the present invention are described in greater detail in co-pending U.S. patent application Ser. No. 07/889,225, filed May 27, 1992, on behalf of Luciw et al., entitled "Method and Apparatus for Deducing User Intent and Providing Computer Implemented Services", now U.S. Pat. No. 5,390,281, and assigned to the assignee of the instant application, the disclosure of which is hereby incorporated by reference in its entirety.

Inputs and outputs in the described invention are preferably accomplished within the context of a computer implemented process known as a "view system." In such a view system, various "views" or "objects" are stacked on top of each other, like pages of paper on a desk top. These views include a root view (such as the notepad) and virtually any number of views (within the limitations of the system) stacked on top of the root view. View systems are well known to those skilled in the art.

The view system is a software routine which returns two pieces of information when the screen is engaged ("tapped") with a stylus. A first piece of information returned is which view or "object" was tapped. The second piece of information returned is the position of the tap on the tapped view. This location information is often returned in the form of Cartesian (x-y) coordinates. The view system therefore handles much of the routine input work for the computer system. Taps by stylus on non-active areas of the screen can be ignored by the view system. Likewise, inappropriate inputs on active areas of the screen can be ignored or can generate error conditions which can be acted upon by the system.

The view system also greatly simplifies output to the computer screen. A "view object" can be created having defined parameters such as height, width, border type, position, etc. Then, the view system can be simply requested to display the view object. Other objects, such as text objects, can be placed within a view object such that they are displayed (to the extent possible) when the view object is displayed. The view system, in turn, preferably utilizes graphics software such as QUICKDRAW, developed by Apple Computer, Inc. of Cupertino, Calif. A description of the QUICKDRAW graphics software is found in the book *Inside Macintosh*, Volumes I, II, and III, by C. Rose et al., Addison-Wesley Publishing Company, Inc., July. 1988. With such graphics software, a line can be drawn by simply specifying the coordinates of the beginning and the end of the line, a rectangle or "box" can be placed around objects by specifying the corner points of the box, text can be drawn to the screen by specifying font, size, and location, etc. Therefore, the use of such graphics software greatly simplifies the screen drawing process of the present invention.

The term "object" has been used extensively in the preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well known texts which describe object oriented programming. See, for example, *Object Oriented Programming for the Macintosh*, by Kurt J. Schmucker, Hayden Book Company, 1986. In the present invention, objects are preferably implemented as part of the aforementioned frame system. The use of object oriented programming, frame systems, and the aforementioned view system simplifies the implementation of the processes of the present invention.

OPERATIONAL EXAMPLES

Figure 3A:
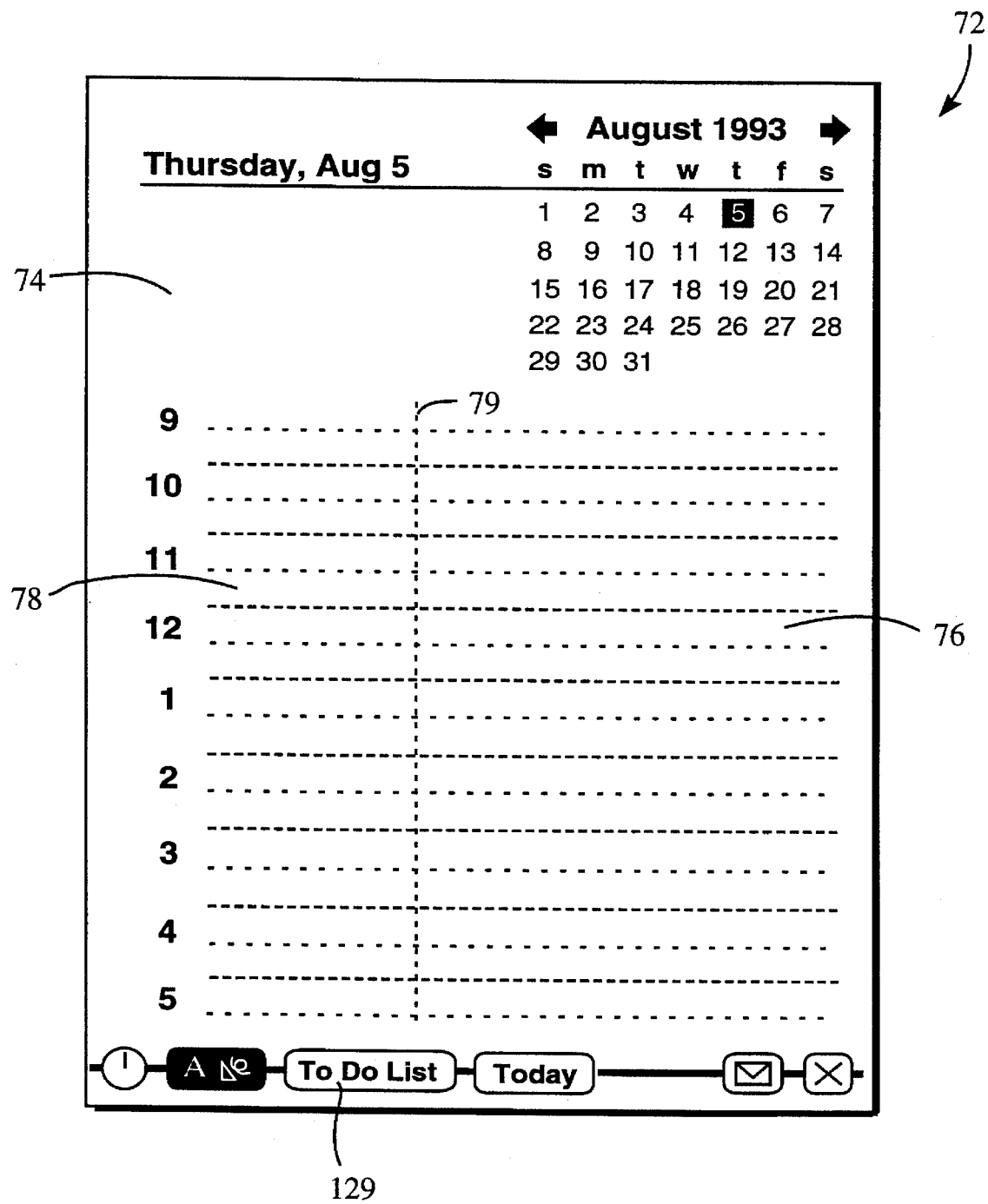

FIG. 3a shows a window 72 produced on screen 42 after activation of the temporal-based scheduler function in accordance with the present invention, e.g. by pressing button 52' of FIG. 2. For purposes of illustration, the selected day is Aug. 5, 1993. In this view, no entries have yet been made into note area 74, annotation area 76, or appointment area 78. All areas within the window 72 are temporal-based. As used herein, temporal-based describes items having an associated temporal value. Temporal values include one or more of a start time, stop time, and date stamp, i.e. either a time or date value, or both. A date stamp refers to a day value, a month value, and year value given to entries made in accordance with the present invention. Annotation area 76 and appointment area 78 comprise a scheduling field of the scheduler function, with annotation area 76 separated from appointment area 78 by a predetermined invisible margin 79 marked at a desired number of pixels (i.e., 80 pixels) from the leftmost edge of the screen. Any entries made substantially to the right of this margin are designated and displayed as annotations, while entries made substantially to the left of this margin are designated and displayed as appointments. The differences involved with displaying and controlling each entry are described in greater detail with reference to the following figures.

It should be noted that the temporal-based functions, including note area 74, annotation area 76 and appointment area 78, all are concurrently active. By "concurrently active" it is meant that each area is active to display information and to receive inputs from the user, such as by means of the stylus. This "concurrently active" status can be handled by the view system which constantly monitors the view objects comprising each area for new inputs and outputs. From a user's point of view, this means that each area can be used for input/output (I/O) substantially simultaneously without having to activate one of the three and deactivating the other two, i.e., each area operates in a non-modal fashion.

Figure 3B:
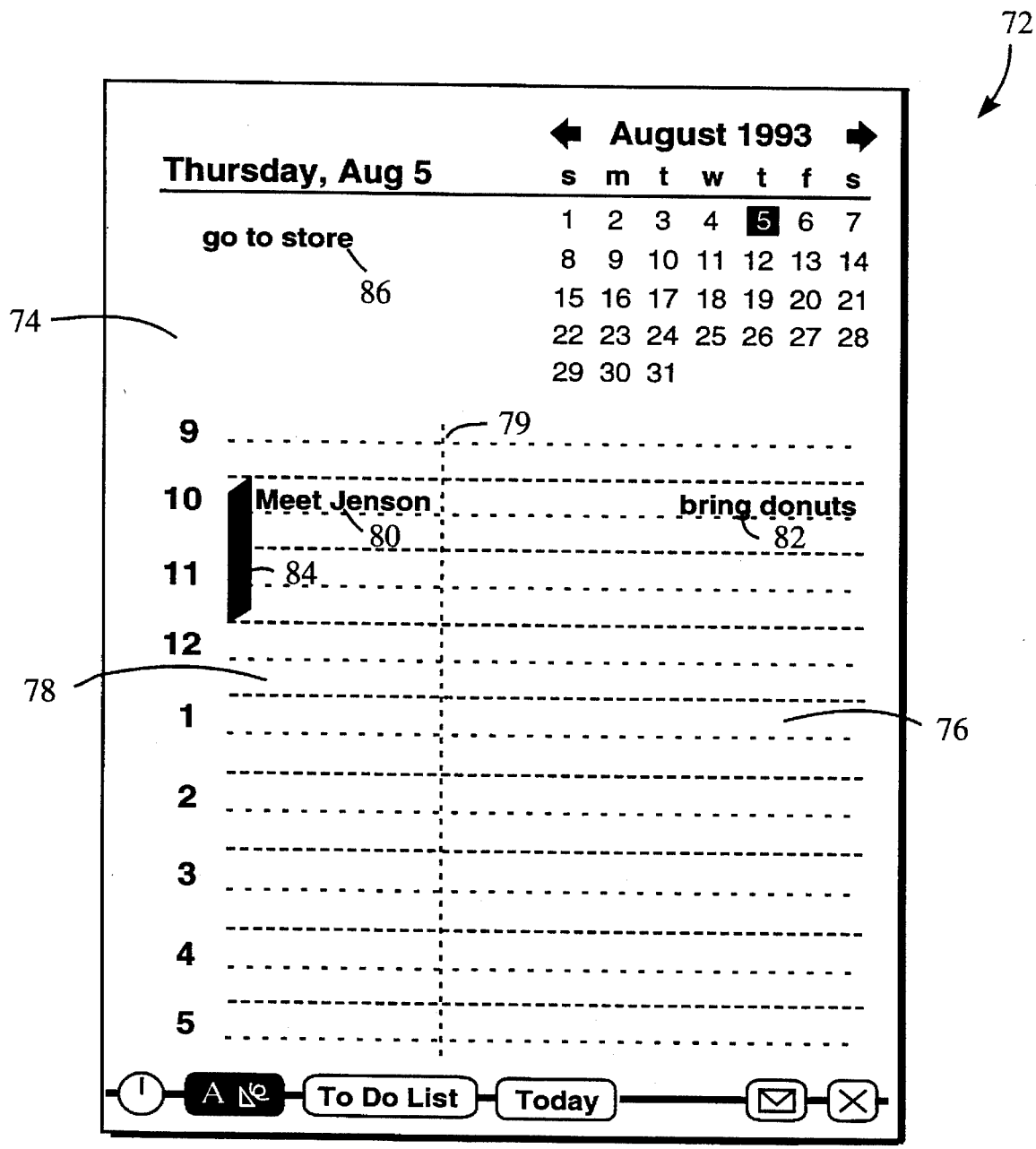

FIG. 3b illustrates the screen view 72 from FIG. 3a with entries made in note area 74, appointment area 76, and annotation area 78. Entries are added by using stylus 38 to "ink" the words on screen 42. Entry 80 written substantially to the left of the invisible margin 79 is designated as an appointment as indicated by the duration bar 84. Entry 82 is designated as an annotation by being written substantially to the right of the invisible margin 79 and therefore has no associated duration bar. In this example, annotation 82 is just text input, but annotations can be graphic inputs as well. Entry 86 is designated as a note by being written into note area 74. Preferably, entries are "recognized" by the system as text, graphical, or numerical information. Recognition techniques are well known to those skilled in the art. A preferred architecture for a recognition system utilized in conjunction with the present invention is described in U.S. patent application Ser. No. 08/001,123, filed Jan. 5, 1993 on behalf of Pagallo et al., entitled "Method and Apparatus for Computerized Recognition", assigned to the assignee of the present invention, and incorporated herein by reference in its entirety.

Figure 4:
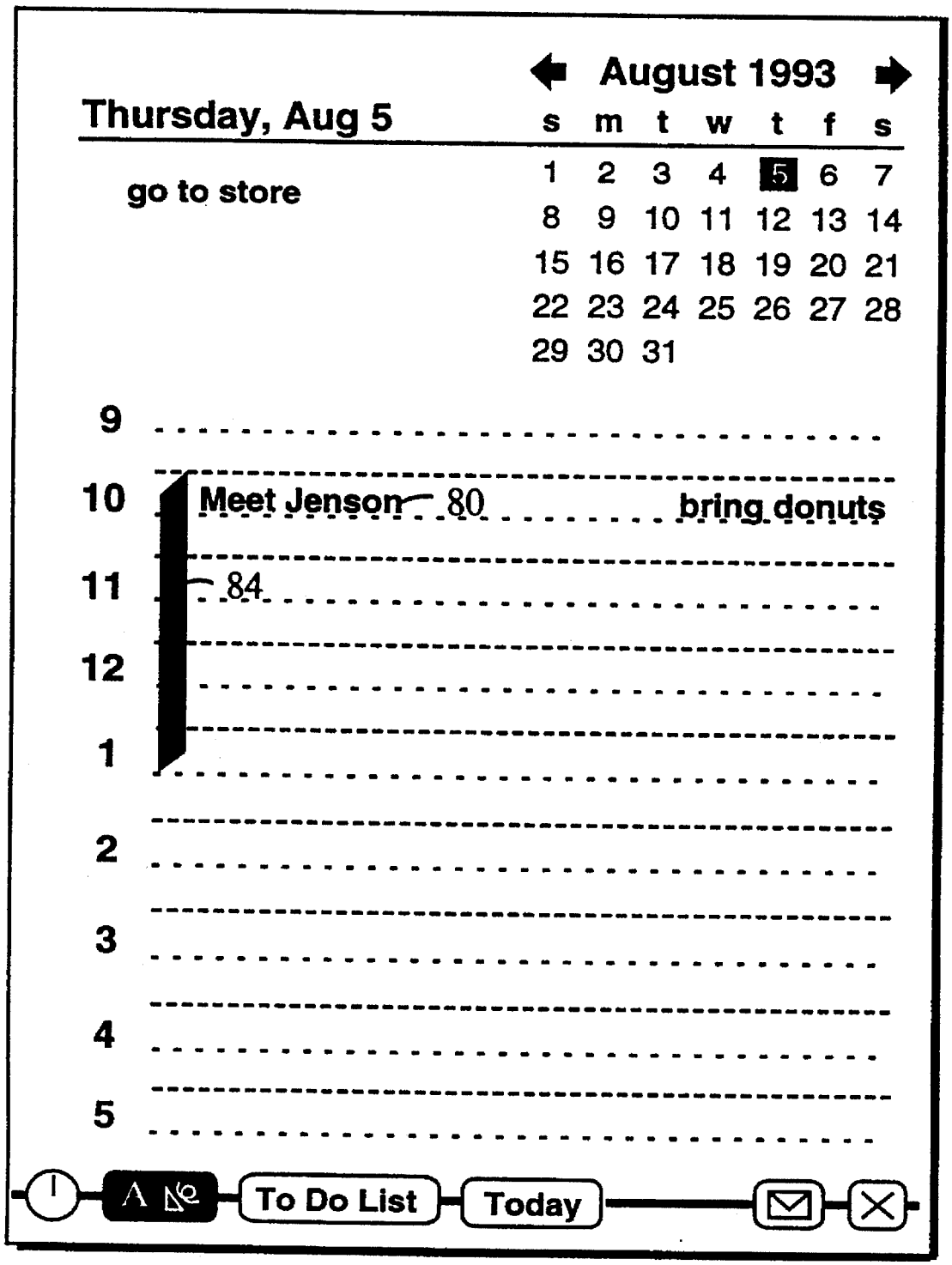

FIG. 4 illustrates the screen view of FIG. 3b with the duration of entry 80 changed. Lengthening of the duration bar 84 occurs with the use of stylus 38 to select the lower end of the duration bar and to drag it vertically downward to cause the length of the bar to increase. The changing of duration bar length can be accomplished by utilization of the aforementioned QUICKDRAW graphics software. Thus, the duration bar 84 is drawn longer as the stylus location is updated point by point. Similarly, an appointment duration can be shortened by moving the stylus vertically upward while selecting the lower end of the duration bar. In this way, editing the duration of an appointment can be done in a convenient and straightforward manner.

Figure 5:
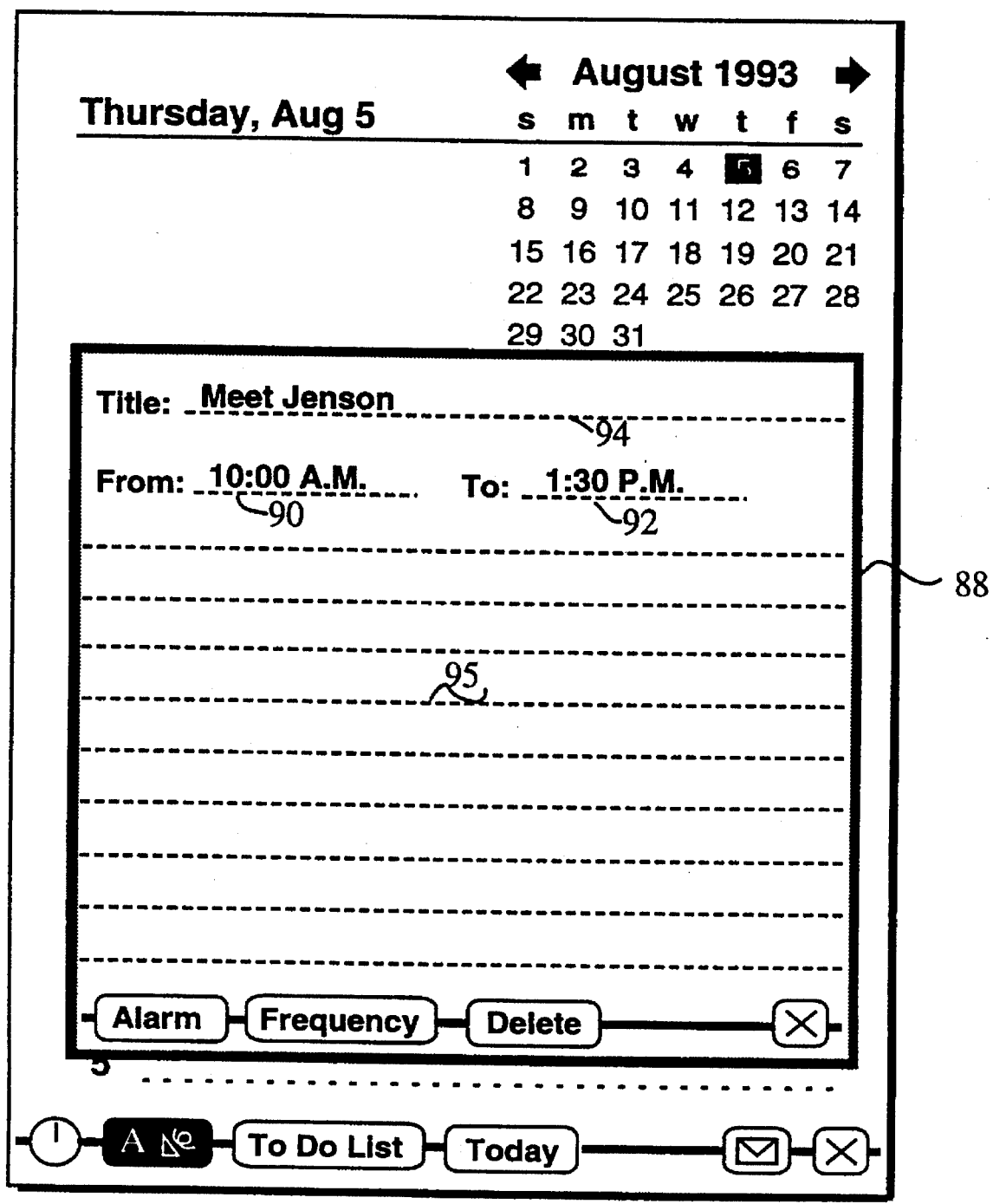

Another manipulation of appointment 80 is illustrated in FIG. 5. In this figure, an edit window 88 is produced by clicking down "tapping" on the duration bar 84 (not shown).

The edit window 88 provides a convenient way of changing the start and/or stop times for appointment 80 by simply writing a new start and stop time into the "to" and "from" fields, 90 and 92, respectively. Similarly, the title of the appointment can also be changed by editing the "title" field 94. Further, this edit window 88 allows additional information to be associated with each appointment. By entering either text or graphics in a sketch area 95 of the edit window, extra information such as a map giving directions to a particular appointment or a contact's phone number needed for an appointment can be added. Thus, all necessary information can be stored and accessed conveniently and efficiently.

FIG. 6 illustrates the results of the changing of the location of appointment 80 in the day's schedule. This change can be done in the edit window by changing the start and stop times as previously described, or by moving the appointment 80 by dragging its duration bar 84 to a new time, in the case shown, one hour later. Thus, updating of a schedule can be accomplished quickly and easily without requiring the reentering of data into a new location with the subsequent deleting of data from its previous location.

Figure 7:
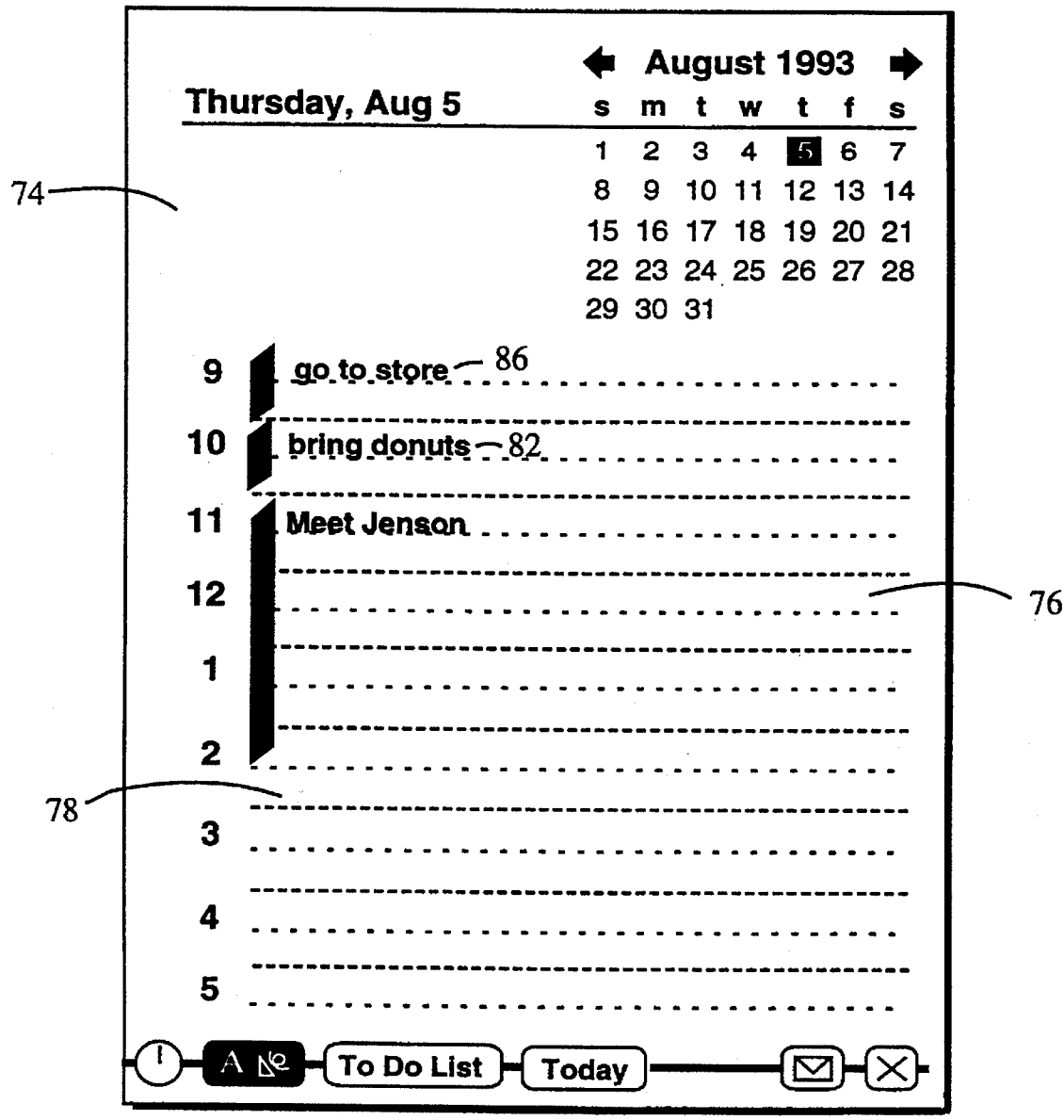

Transfer of data can also be easily accomplished between the note, annotation and appointment areas, 74, 76, and 78, as shown in FIG. 7. In this figure, note entry 86 and annotation entry 82 have been added to the list of scheduled appointments by dragging each respective entry from note area 74 and annotation area 76 into appointment area 78. A "dragging" gesture involves engaging an entry with the stylus 38, moving the stylus across the screen 42, and lifting the stylus 38 from the screen to leave the entry in its new location. Each entry moved now has a duration bar associated with it, so that each now has an associated duration and edit window. The default duration of 1 hour is provided for each added entry, but the duration can easily be altered as desired in any of the manners described previously. Further, movement of entries is not restricted merely into the appointment area as shown but can be performed interchangeably between areas. In this way, entries can readily be transferred, providing necessary flexibility for convenient schedule rearrangement.

Figure 8:
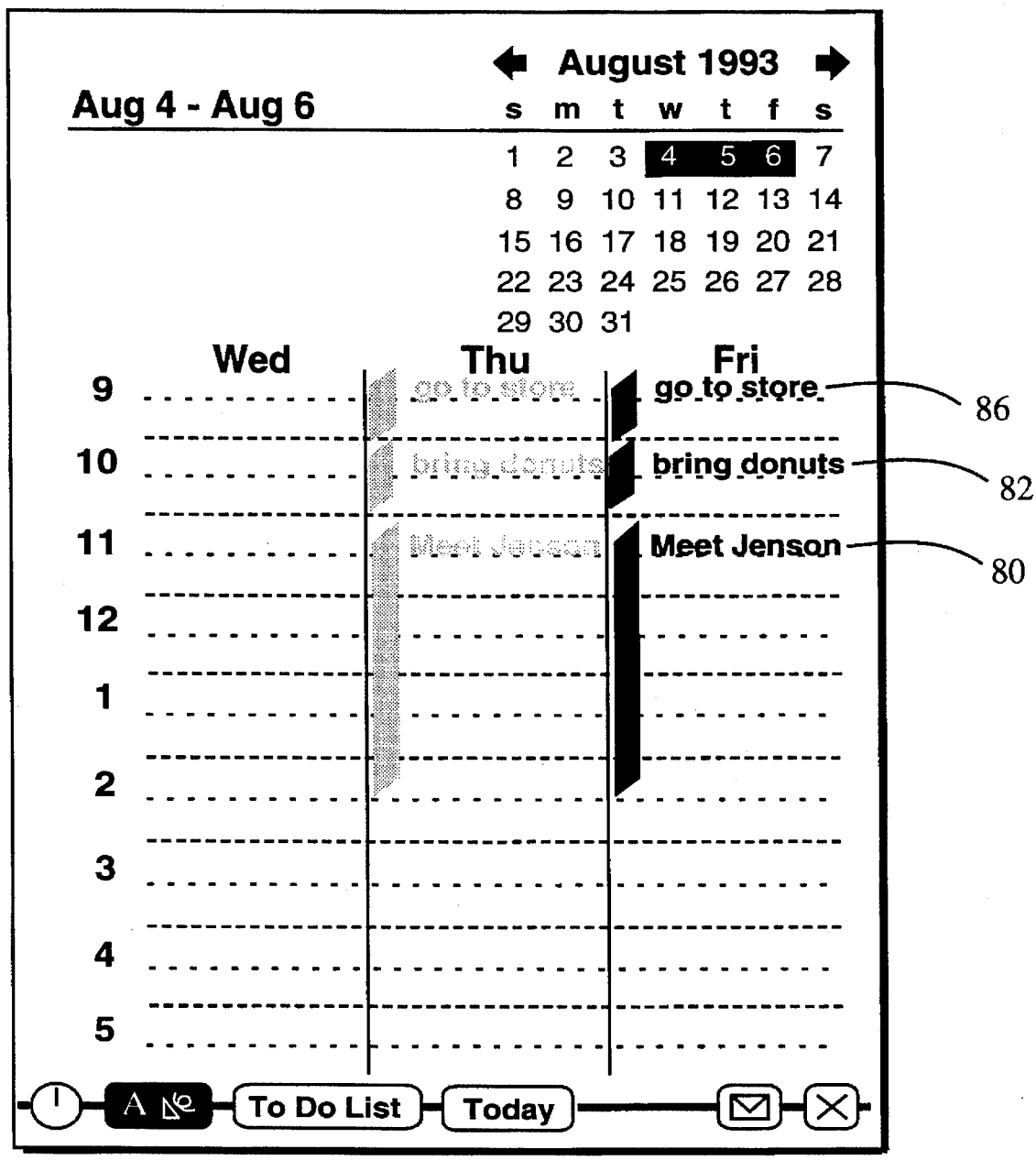

Schedules also can require the shifting of entries from one day to another. FIG. 8 presents a three-day schedule view showing entries 80, 82, and 86 moved from the Thursday schedule to the Friday schedule. This change is easily accomplished by selecting and dragging each entry into a new desired day and time. In this example, the entries have been moved a day forward, but the entries can just as easily be moved a week or more ahead and/or placed at different times. The selection and displaying of multi-day views is described in detail in co-pending parent U.S. patent application Ser. No. 08/075,101, filed May 3, 1993, on behalf of Jenson and entitled "Schedule and To-Do List for a Pen-Based Computer System", that was incorporated by reference. For purposes of illustration, entries 80, 82, and 86 have been shown in shadow in their original locations.

Figure 9:
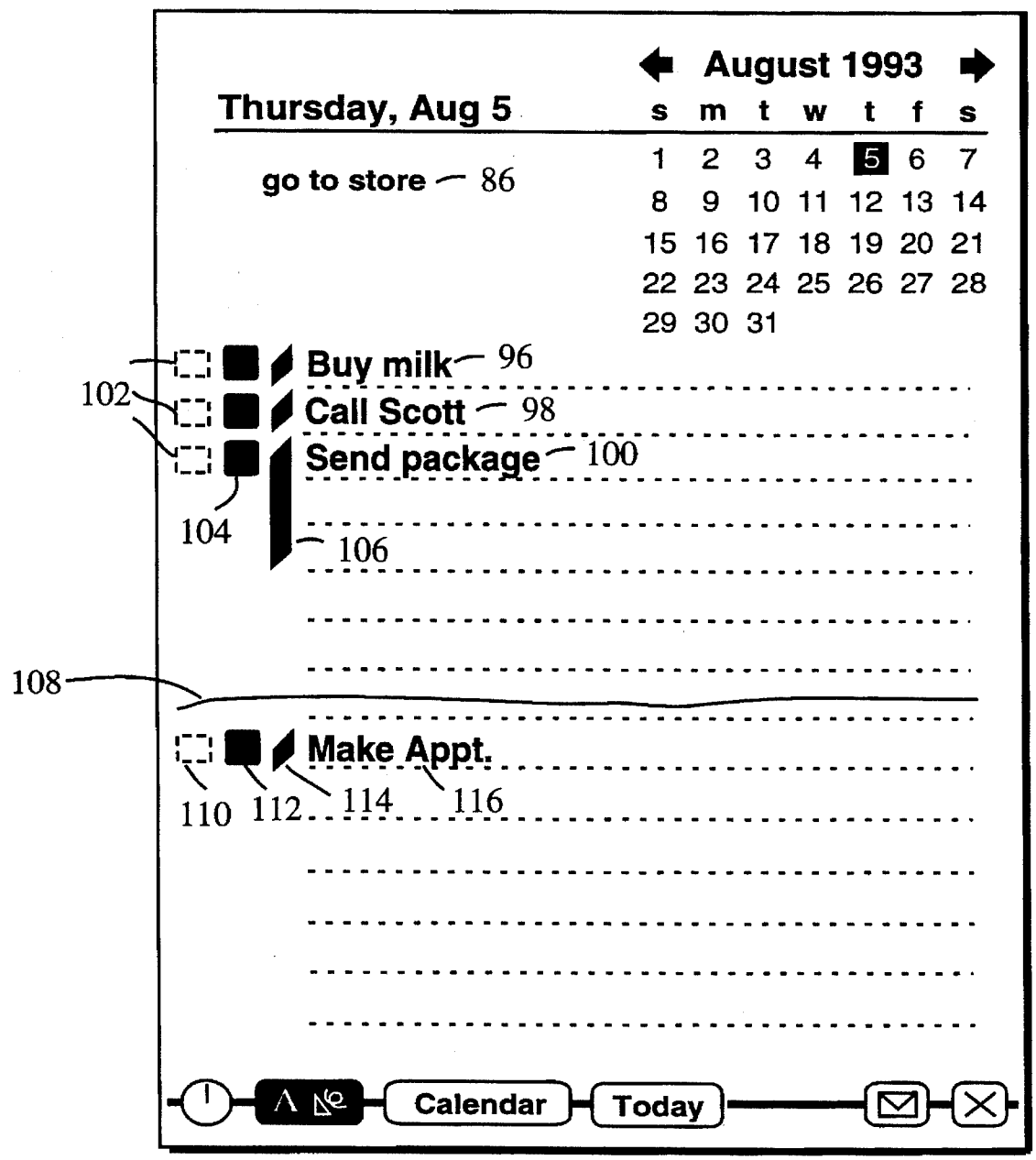

In FIG. 9, the view has been changed to the to-do list function for the single day as originally shown in FIG. 3b. Note entry 86 remains visible and to-do entries 96, 98, and 100 are now present. Each of the to-do entries has a check box 102, a priority box 104, and duration bar 106. Check box 102 allows entries to be designated as completed by simply entering a check mark in the box. Unmarked entries are carried forward to the next day so that undone tasks automatically remain on the to-do list. Priority box 104 displays a pull-down menu of choices to designate the priority of each to-do entry and is further described with reference to FIG. 10. Duration bar 106 behaves similarly to an appointment's duration bar, so that notes can be attached to to-do entries in the same manner as described previously with reference to the schedule function. The start and stop fields hold the difference in the two forms of the edit window. Since a to-do entry does not have a start or stop time, these fields in the edit window are not alterable. New entries can be added to the to-do list by making a breaker bar 108 with the stylus 38. A breaker bar is made by moving the stylus 38 horizontally across the width of screen 42. Breaker bar formation is decribed in detail in co-pending U.S. patent application Ser. No. 07/868,013 filed Apr. 13, 1992, on behalf of Tchao et al, entitled "Method for Manipulating Notes on a Computer Display" now U.S. Pat. No. 5,398,310, and assigned to the assignee of the instant application, the disclosure of which is hereby incorporated by reference in its entirety. A new check box 110, priority box 112, and duration bar 114 appear as the stylus 38 is removed to display the addition of a new to-do entry 116.

Figure 10:
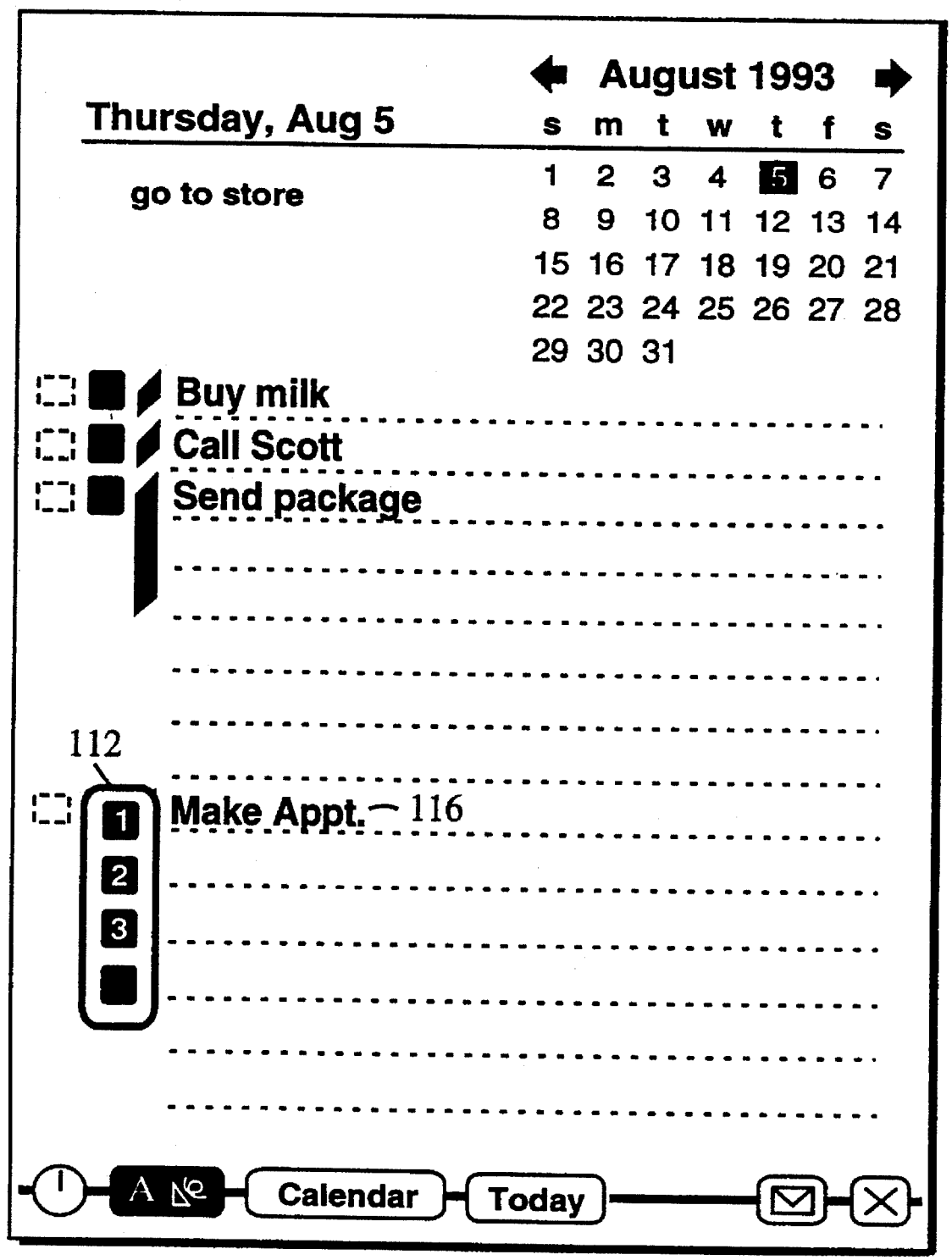

FIG. 10 shows the pull-down menu produced by selection of the priority box 112 of to-do entry 116. As shown, priorities of 1, 2, 3 are automatically provided for designating an order for entries, with a blank priority provided for designating entries with no priority. A hierarchy of to-do entries can then be listed, providing an efficient list of prioritized tasks.

Figure 11:
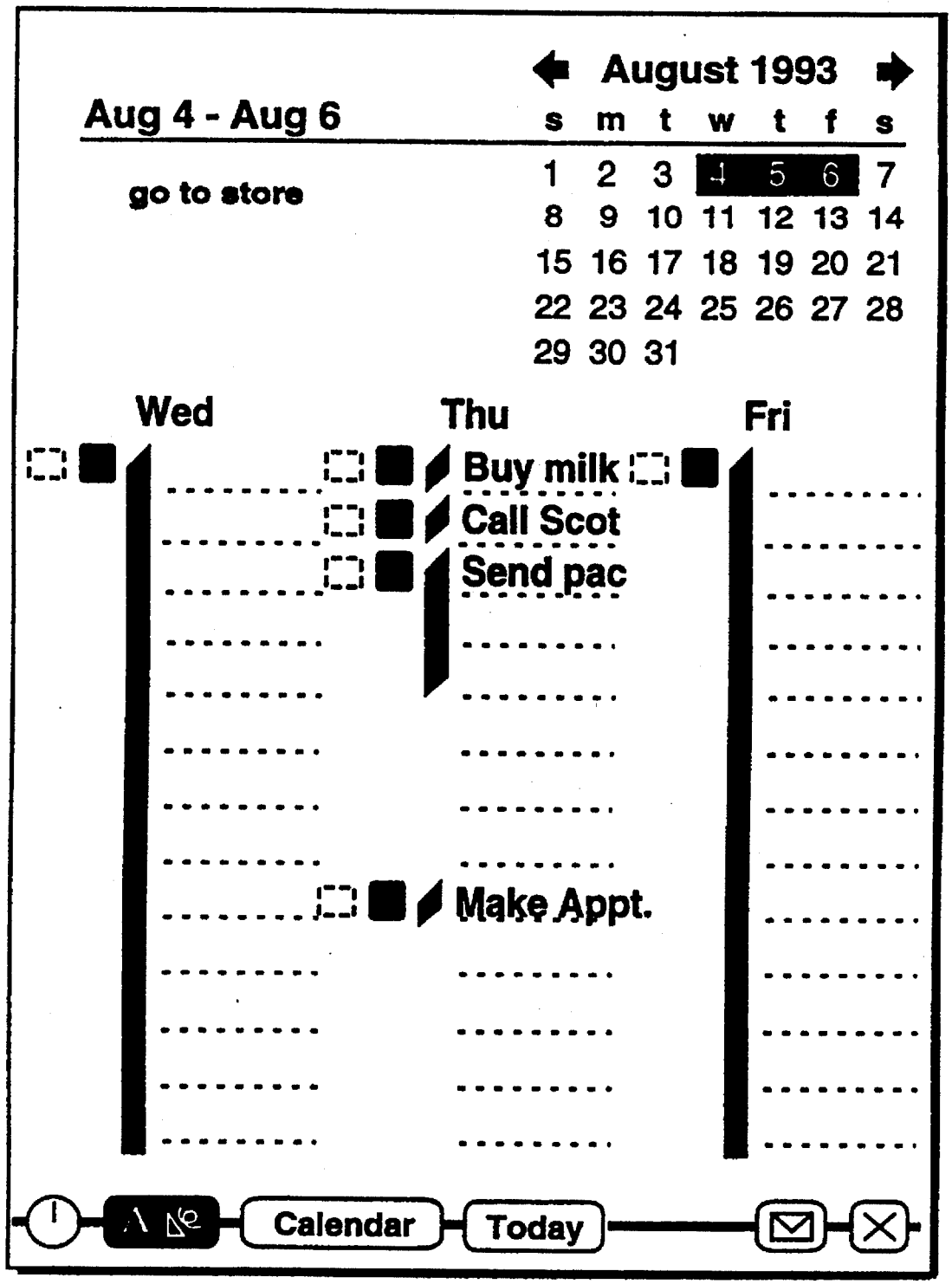

A three-day view of to-do entries is illustrated in FIG. 11. Multi-day views such as that shown allow the user to review entries efficiently over a desired time frame. Multi-day views available include a week view, a series of consecutive days, as shown, or a view of a specified day of a week over an entire month's time. The production of multi-day views is described in greater detail in co-pending parent U.S. patent application Ser. No. 08/075,101, filed May 3, 1993, on behalf of Jenson and entitled "Schedule and To-Do List for a Pen-Based Computer System" that was incorporated by reference. Manipulation of entries between days is much easier when a multi-day view is used, as described with reference to FIG. 12.

Figure 12:
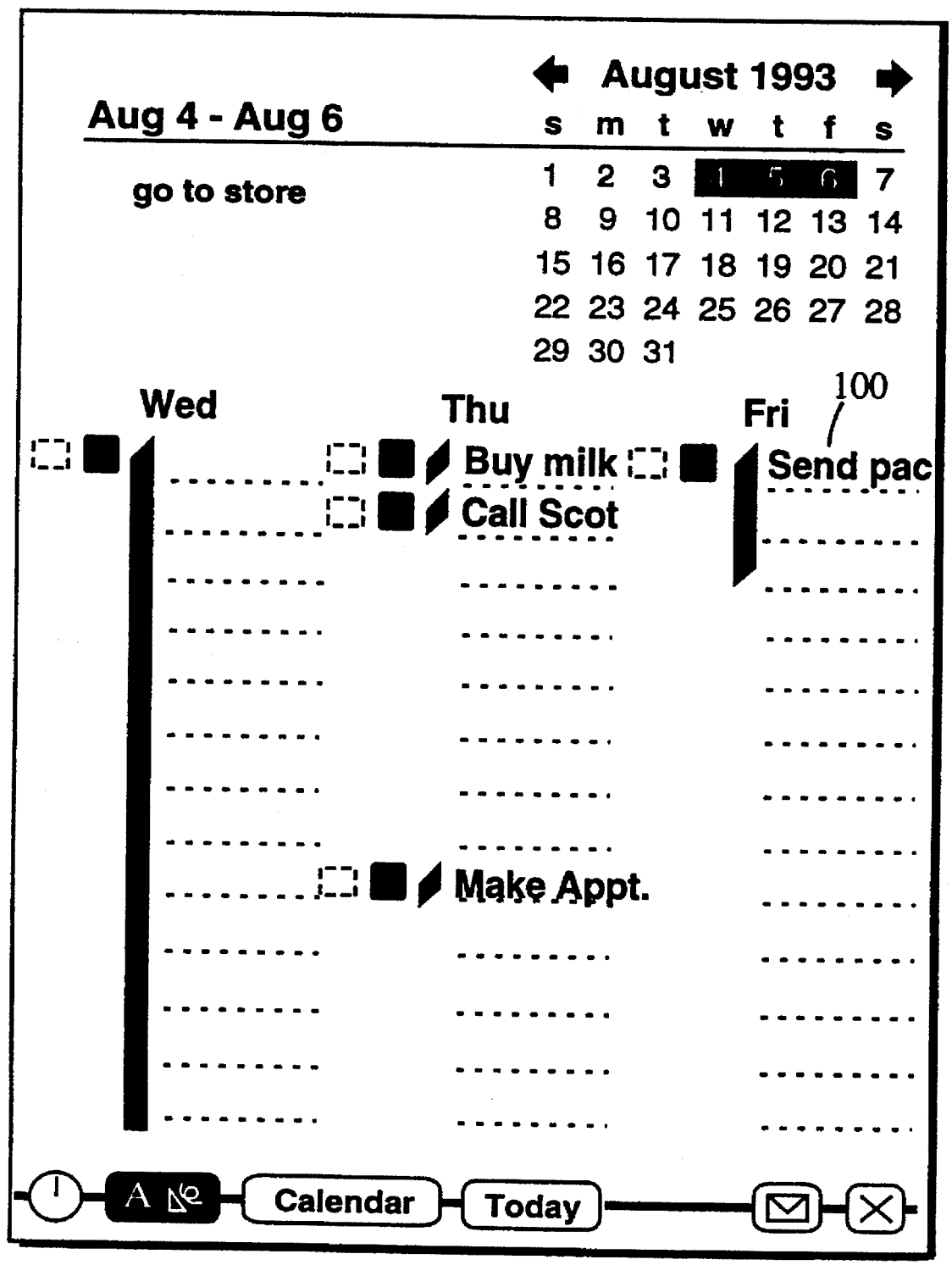

FIG. 12 presents the result of one manipulation of entry 100 by selecting the entry from its original location on Thursday and moving it to its new location on Friday. The ability to move items between days simplifies the process of organizing items without requiring information to be rewritten or copied in the new location and subsequently deleted from the old location. Thus, to-do list entries can be conveniently rearranged.

Figure 13:
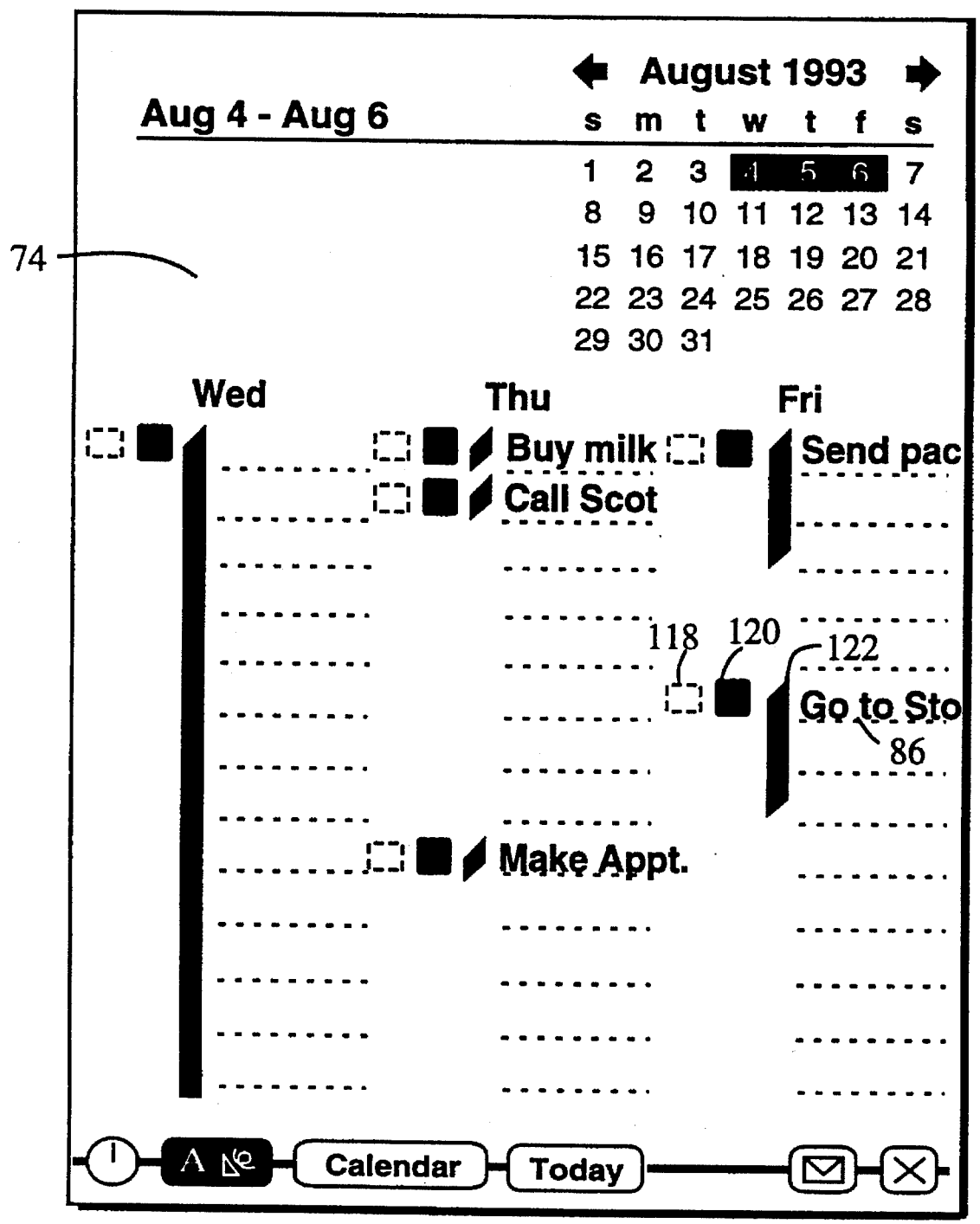

Similarly, entries can also be easily rearranged by moving entries from the note area 74 to a desired to-do list, as illustrated in FIG. 13. As a to-do entry, note entry 86 now has an associated priority box 118, check box 120, and duration bar 122. Although not illustrated, to-do entries can just as easily become note entries by the reverse procedure of dragging an entry from a to-do list into note area 74. The capability of moving data and information as described exemplifies the convenience and efficiency that a digital assistant incorporating the methods of the present invention can provide.

PREFERRED COMPUTER IMPLEMENTED PROCESS

Figure 14:
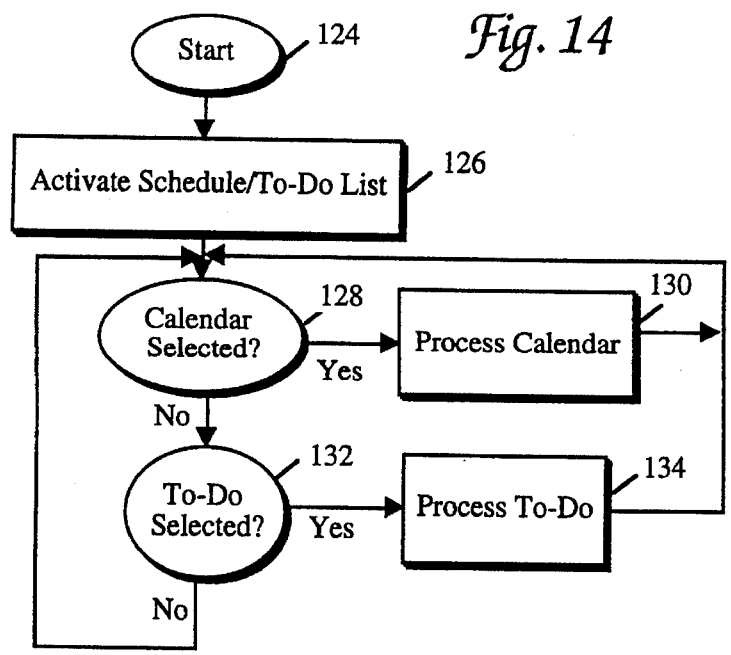
FIG. 14 is a flow diagram illustrating a process in accordance with the present invention.

FIG. 14 is a flow diagram of a process in accordance with the present invention for performing the functions illustrated in FIGS. 3a, 3b, and 4–13. The process begins at 124, and in a step 126, the schedule/to-do list function is activated.

This activation occurs with the selection of the control button 52' as previously described and results in the production of the default schedule function view. Once activated, the next step 128 checks for the selection of the calendar/schedule view by the selection of the calendar button 129 (FIG. 3*a*). If the schedule function is selected, the process continues in step 130 with the processing of schedule functions, which are further described with reference to FIGS. 15–20. If the schedule function has not been selected, step 132 checks for the selection of the to-do list function. If selection is detected, step 134 processes to-do list functions, further described in FIGS. 21–24. Upon completion of steps 130 or 134, or with a negative result in decision step 132, the process returns to step 128 to repeat the loop.

Figure 15:
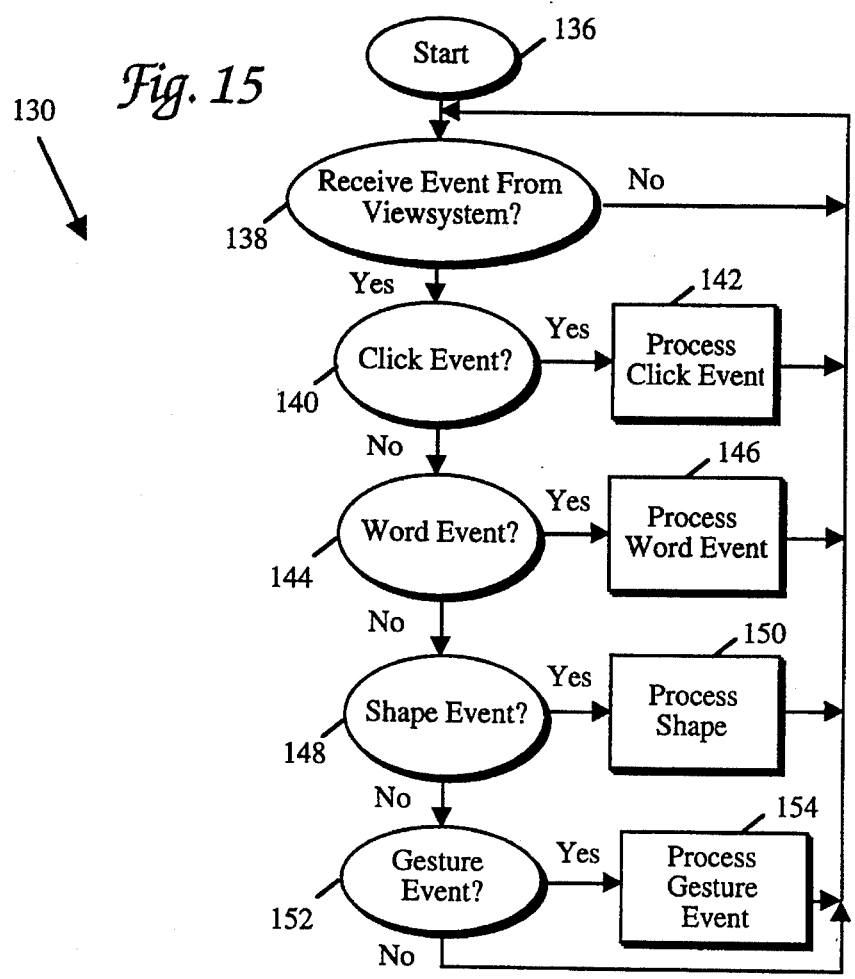
FIG. 15 is a flow diagram illustrating the process step 130 of FIG. 14.

FIG. 15 is a flow diagram illustrating step 130 of FIG. 14 in greater detail. The process begins in step 136, and a first step 138 waits for the receipt of an event from view system. An "event from view system" is an input action that is intended for the schedule view. Once an event is received, the next steps determine which type of event has occurred. The first check in step 140 is for a "click" event. If detected, the click event is processed in step 142, and this step is further illustrated in FIG. 16. If no click event has occurred, the next step 144 checks for a word event, and if detected, the word event is processed in step 146. Word event processing is detailed in FIG. 18. If no word event is detected, step 148 checks for a shape event. Processing of a shape event in step 150 is performed upon detection of receiving a shape event and is further described in FIG. 19. Step 152 determines if a gesture event has occurred and processes the gesture event in step 154. Step 154 is illustrated in greater detail in FIG. 20. Upon completion of processing, the series of steps are repeated. Of course, the order of the decision steps 140, 144, 148, and 152 is irrelevant.

Figure 16:
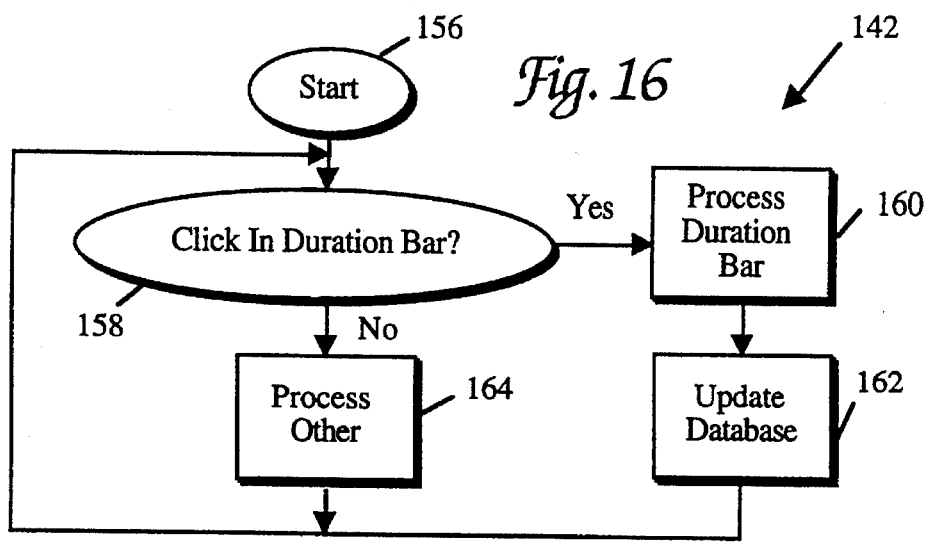
FIG. 16 is a flow diagram illustrating the process step 142 of FIG. 15.

The method of processing a click event is presented in the flow diagram of FIG. 16. The method begins at 156 and the first check is for a "click" in the duration bar of an appointment in step 158. If detected, the click in the duration bar is processed in step 160, which is further detailed in FIG. 17. Upon completion of the click processing, the database is updated in step 162 to reflect the click event and the process returns to repeat the loop of steps 158–162. If no click is detected in the duration bar, the click occurred in some other area of the schedule, and this click is processed in step 164 before returning to repeat the process. Since the "process other" step is not relevant to the present invention, it will not be discussed further.

Figure 17A:
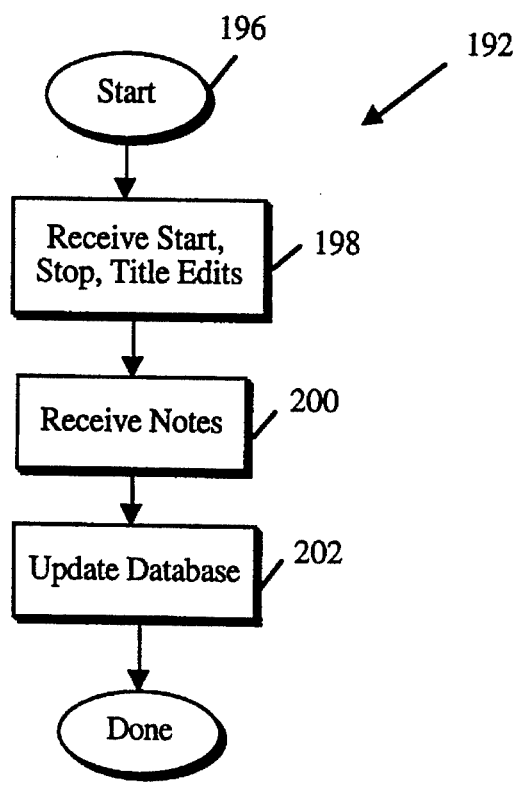
FIG. 17a is a flow diagram illustrating the process step 192 of FIG. 17.
Figure 17:
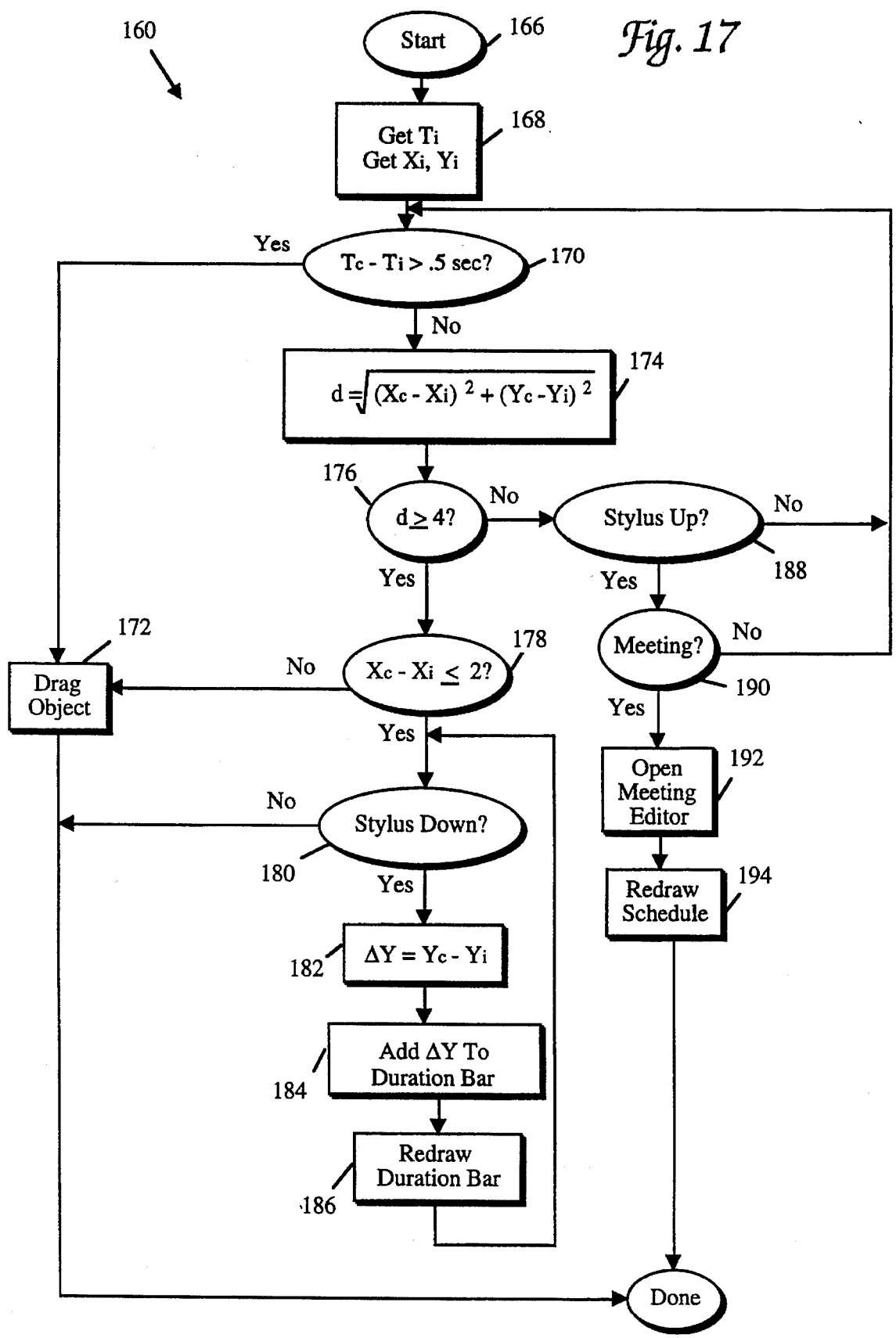
FIG. 17 is a flow diagram illustrating the process step 160 of FIG. 16.

FIG. 17 is a flow diagram of the steps for processing a click detected in a duration bar. Three actions can occur from a click action on the duration bar: (1) the appointment can be moved from one location to another within the schedule; (2) the appointment duration can be changed by altering the duration bar length; and (3) the edit window can be opened for attaching an annotation to the appointment.

The process 160 begins in step 166 and in step 168, the initial time and x-y coordinates of stylus placement on the duration bar are determined. The next step 170 checks for a change in time greater than one-half of a second between initial contact and the current contact of the stylus. If the contact is detected for more than one-half second, the click is interpreted as a dragging motion to change the location of the entry. The entry is dragged with the stylus movement in step 172, and the process is completed. If the contact is not held for more than one-half second, the next step 174 determines the distance between the initial placement of the stylus and the current position. If the distance is greater than or equal to four pixels as determined in step 176, the next step 178 calculates the displacement of the stylus in the x direction. If the distance is not less than or equal to 2 pixels, the click is again interpreted as a dragging of the duration bar to place the appointment at a new location, and the entry is therefore dragged to the new spot in step 172, and the process is completed. If the stylus has only been displaced 2 pixels or less horizontally, the click is interpreted as an attempt to change the duration of the appointment by changing the length of the duration bar. The next step 180 verifies that the stylus is still being held down. If the stylus is still down, step 182 calculates the change of the stylus in the vertical direction. This displacement value is then used to adjust the duration bar length in step 184, and the duration bar length is redrawn to this new length in step 186. The process then returns to step 180 to check for an additional change in the duration bar length until the stylus contact is no longer detected. If the change in the displacement of the stylus is found to be less than four pixels, the intent is interpreted as a click to open the edit window. The process verifies that the stylus is up and that the click occurred on an appointment in steps 188 and 190, respectively. If either is not true, the process returns to repeat the sequence of checks. If both are true, the edit window is opened in step 192 (detailed in FIG. 17*a*), and the schedule is redrawn to reflect changes to the appointment start time, stop time, or title in step 194 before the process is completed.

The flow diagram of FIG. 17*a* presents the steps involved in the opening of the edit window in step 192 of FIG. 17. The process begins in step 196 and then continues with the receipt of the edits to the times for starting and stopping the appointment or to the title of the appointment in step 198. In the next step 200, any notes associated with the appointment from the edit window are received. These changes are then reflected in the system with the updating of the database in step 202 before the process is completed.

Figure 18:
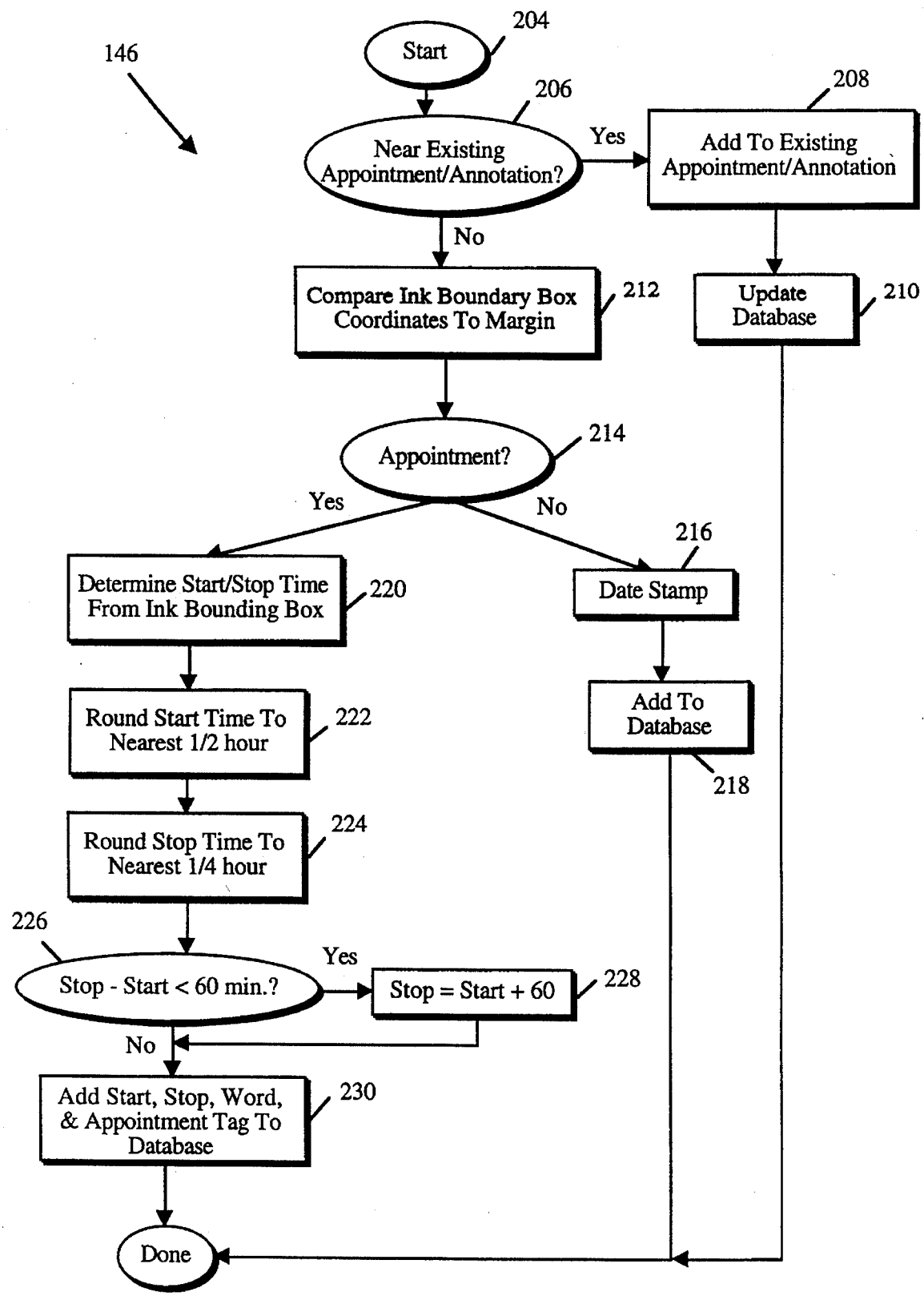
FIG. 18 is a flow diagram illustrating the process step 146 of FIG. 15.

FIG. 18 illustrates the process word event step 146 of FIG. 15 in greater detail. The process begins in step 204, and step 206 determines if the word event occurred near an already existing appointment or annotation. If this condition is true, the word event is interpreted as an addition to an already existing entry and is therefore added to the existing entry in step 208. The database is then updated in step 210 before the process is finished. If the word event is not near an existing entry, it is interpreted as a new entry. The next step 212 determines the location of the word event by comparing the coordinates of the input to the designated margin coordinates that separates appointments from annotations. If the entry is not detected as an appointment (i.e., it is to the right of the margin) in step 214 the entry is date stamped in step 216 and its contents are added to the activated day's schedule in the database in step 218 before the process is completed. If the data is an appointment (i.e., it is to the left of the margin), the start and stop times for the appointment are determined in step 220. The start time and stop time are then rounded to the nearest one-half and one-quarter hours, respectively, in steps 222 and 224. In the next step 226, the length of the appointment is determined, and if it is less than the one hour default length, it is changed to one hour in step 228. Upon completion of this step or if the length of the appointment is an hour or more, the process continues in step 230 with the addition of the appointment including its start time, stop time, and title into the database. The word event process 146 is then finished.

Figure 19:
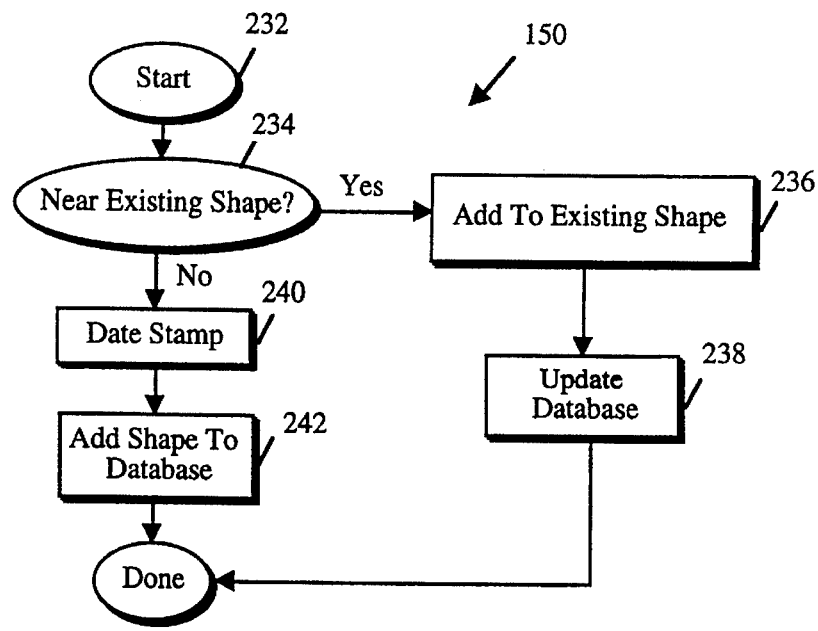
FIG. 19 is a flow diagram illustrating the process step 150 of FIG. 15.

Shape event processing is shown in the flow diagram of FIG. 19. The process begins in step 232 and determines if the shape event has occurred near an already existing shape in step 234. If it has, the new shape is added to the existing shape in step 236 and the database is updated to reflect the change in step 238 before the process is completed. If the shape event is a new shape, the shape is date stamped to the currently activated date in step 240. The shape is then added to the database in step 242, and the process is completed.

Figure 20:
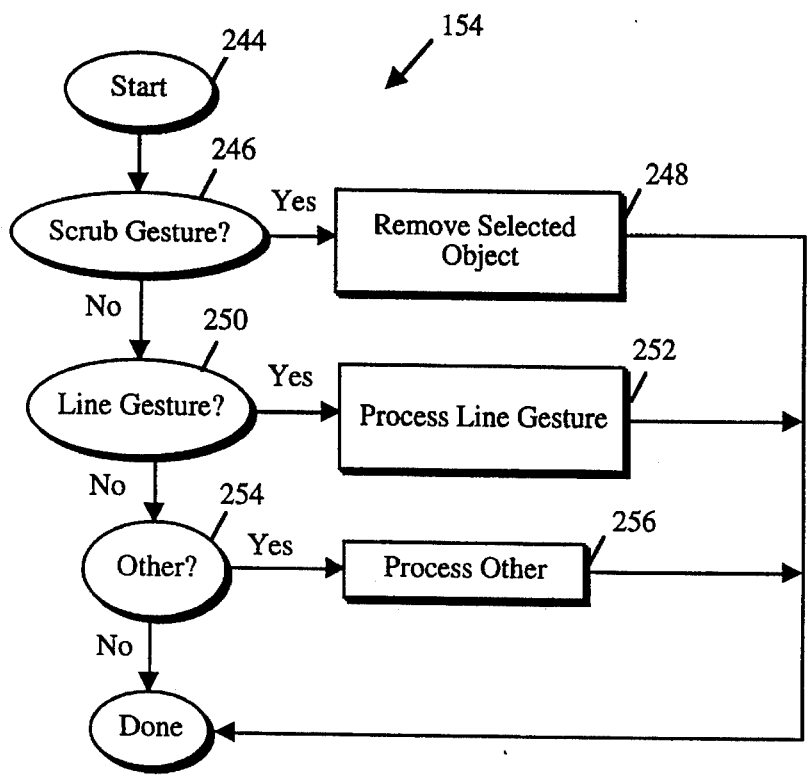
FIG. 20 is a flow diagram illustrating the process step 154 of FIG. 15.

The flow diagram of FIG. 20 details the process gesture event step 154 of FIG. 15. The process begins in step 244, and a first check is made to determine if a scrub gesture has been made in step 246. A scrub gesture is the action of moving the stylus across an entry to form a continuous zig-zagging line indicating the desire to delete that entry. The details of scrubbing are given in co-pending U.S. patent application Ser. No. 08/070,094 filed May 27, 1993, on behalf of Capps, et al, entitled "Method for Deleting Objects on a Computer Display" and assigned to the assignee of the instant application, the disclosure of which is hereby incorporated by reference in its entirety. Upon detection of a scrub gesture, the scrubbed out entry is removed in step 248 before the process is completed. If a scrub gesture is not detected, the next step 250 determines if a line gesture has been made. If a line gesture has been made, the next step 252, which is detailed in FIG. 21, processes the line gesture. If some other gesture, as detected in step 254, has been performed, it is processed in step 256. The process gesture event 154 is then completed. Again, the order of decision steps 246, 250, and 252 is irrelevant.

Figure 21:
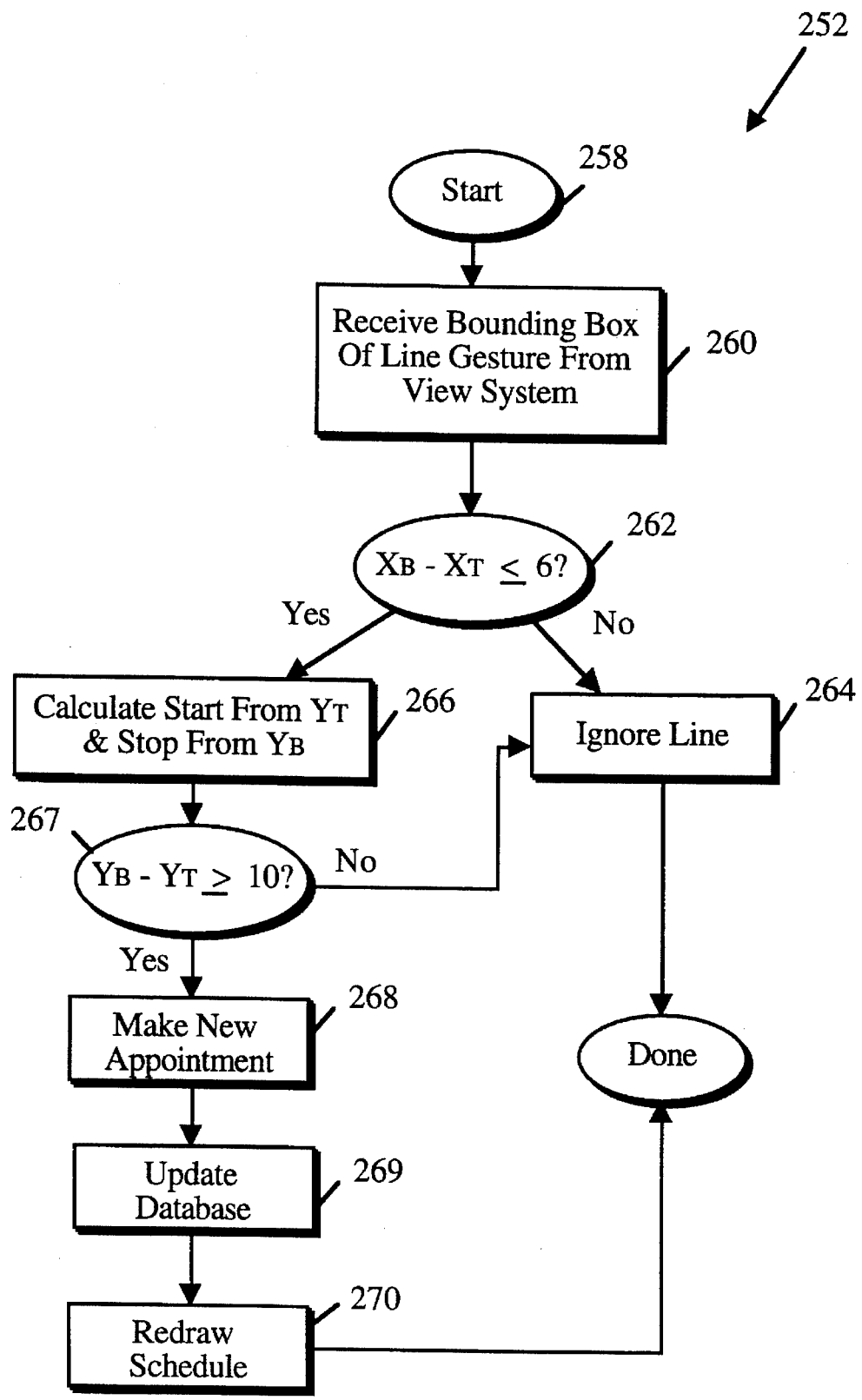
FIG. 21 is a flow diagram illustrating the process step 252 of FIG. 20.

The process line gesture step 252 of FIG. 20 is detailed in the flow diagram of FIG. 21. It begins in step 258 and receives the bounding box of the line gesture from the view system in step 260. If the width of the box is greater than six pixels, as determined in step 262, the gesture is ignored and interpreted as an inadvertent error in step 264 before the process is completed. If the width of the bounding box is less than or equal to six pixels, the height of the bounding box is determined in step 266. If the height of the bounding box is determined to be less than ten pixels in step 267, the gesture is again ignored in step 264, and the process is finished. If the height of the bounding box is greater than or equal to ten pixels, then the line gesture is interpreted as an attempt to form a new appointment entry. An empty appointment entry is formed in step 268 in a similar manner to the formation of a new to-do entry by a breaker bar gesture. The difference between the two gestures is that the line gesture is a substantially vertical line entered in the appointment area of the schedule function view, while the breaker bar gesture is a substantially horizontal line entered in the to-do list function view. (The processing of a breaker bar gesture is described with reference to FIG. 24.) Updating of the database occurs in step 269, and the schedule is subsequently redrawn in step 270 to reflect the addition of a new appointment entry before the process is completed.

Figure 22:
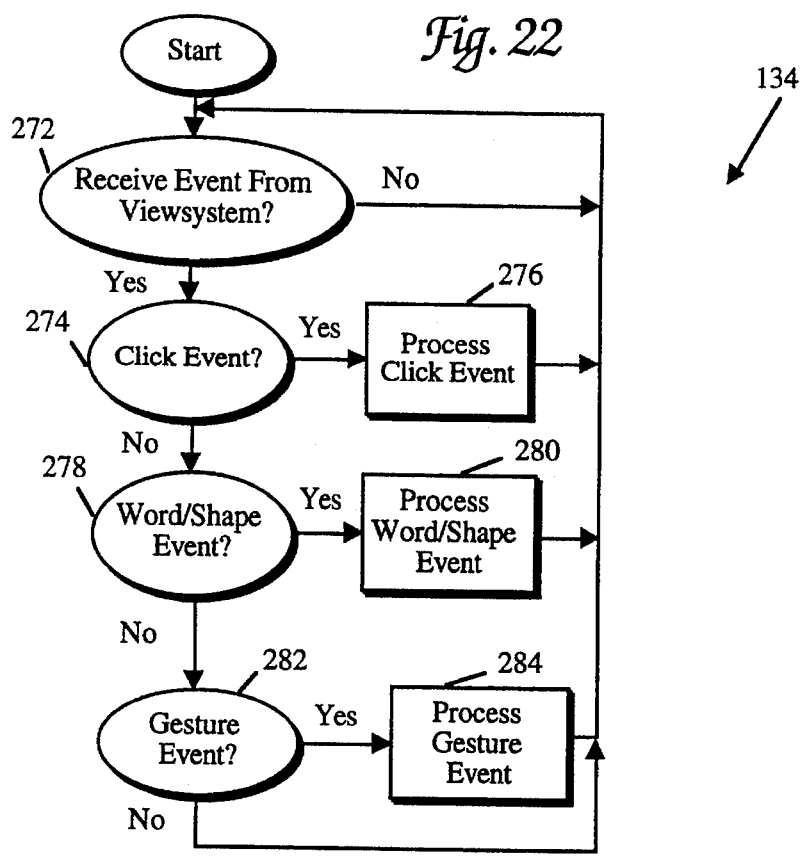
FIG. 22 is a flow diagram illustrating the process step 134 of FIG. 14.

The process to-do list function step 134 of FIG. 14 is illustrated in the flow diagram of FIG. 22. The process begins by waiting for an event from the view system in step 272. Step 274 determines if a click event has occurred. If a click event is detected, it is processed in step 276. The details of processing a click event for the to-do list function are the same as that explained with reference to the schedule function in FIG. 17. If no click event has occurred, the next step 278 determines if a word or shape event has occurred. Upon detection, the word or shape event is processed in step 280, which is detailed in FIG. 23. If no word or shape event is detected, then the occurrence of a gesture event is determined in step 282. Upon detection, gesture event processing follows in step 284. After completion of the processing of events, the sequence is repeated.

Figure 23:
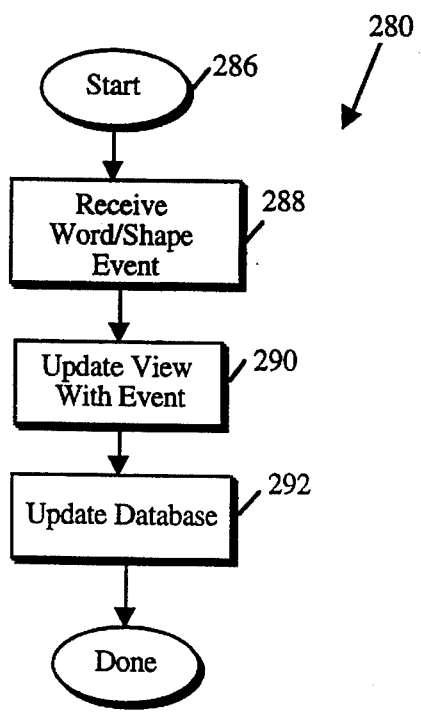
FIG. 23 is a flow diagram illustrating the process step 280 of FIG. 22.

FIG. 23 is a flow diagram illustrating step 280 of FIG. 22.

The process begins in step 286 and continues with the receipt of a word or shape event in step 288. The view of the to-do list is then updated in step 290 to reflect the addition of the word or shape event. The database is then updated in step 292 before the process is completed.

Figure 24:
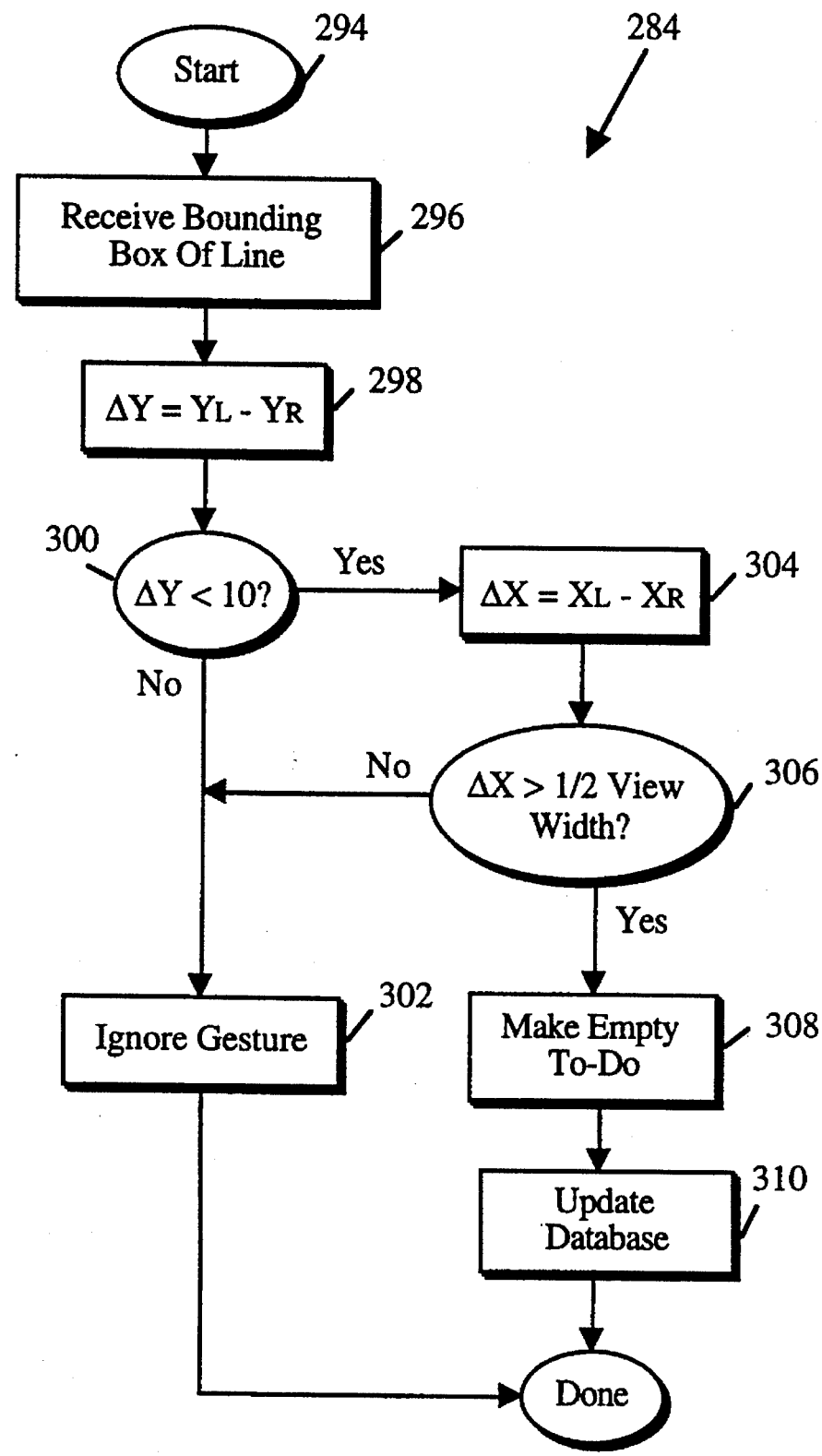
FIG. 24 is a flow diagram illustrating the process step 284 of FIG. 22.

Processing of a gesture event for the to-do list function is detailed in the flow diagram of FIG. 24. The process begins in step 294. The bounding box of a line gesture is received in step 296. The height of the line gesture is calculated in the next step 298. If the height is greater than ten pixels as determined in step 300, the gesture event is interpreted as inadvertent and the line gesture is ignored in step 302 before the process is completed. If the height of the bounding box is less than ten pixels, the process continues with the calculation of the width of the line gesture in step 304. Again, the line gesture will be ignored if the width is less than one-half of the screen viewing width, as determined in step 306. If the width of the line gesture is greater than one-half of the screen viewing width, the line gesture is interpreted as an attempt to form a new to-do entry, and an empty to-do entry is created in step 308. The database is updated to reflect the to-do entry addition in step 310 before the process is done.

While this invention has been described in terms of several preferred embodiments, there are alterations, permutations, and equivalents which fall within the scope of this invention. It should also be noted that there are many alternative ways of implementing the processes of the present invention. For example, much of the programming can be simplified by using the high-level utilities and data structures mentioned in the preceding specification. In particular, the described frame database system and view system are preferred methods for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method for controlling a computerized organizer comprising the steps of:

executing a computer-implemented process which supports a plurality of non-model temporal-based functions including a scheduler, a to-do list and a note function, wherein said scheduler includes an appointment area and an annotation area, said appointment area and said annotation area being separated by an invisible margin such that temporal-based entries corresponding to annotations in said annotation area that are moved across said invisible margin to said appointment area are transformed into temporal-based entries corresponding to appointments and temporal-based entries corresponding to appointments that are moved across said invisible margins into said annotation area are transformed into temporal-based entries corresponding to annotations;

selecting a temporal-based entry within one said temporal-based functions;

moving said temporal-based entry at least within one of said temporal-based functions in response to a user-initiated move command; and editing a temporal-based entry in response to a user-initiated edit command.

2. A method for controlling a computerized organizer as recited in claim 1 wherein said step of activating includes activating a temporal-based note area and a temporal-based scheduler area.

3. A method for controlling a computerized organizer as recited in claim 2 wherein said temporal-based entry is moved within said temporal-based scheduler area.

4. A method for controlling a computerized organizer as recited in claim 3 wherein said moving includes updating a time associated with said temporal-based entry.

5. A method for controlling a computerized organizer as recited in claim 2 wherein said step of activating includes displaying a plurality of dates in said temporal based scheduler area.

6. A method for controlling a computerized organizer as recited in claim 5 wherein said temporal-based entry is moved between said plurality of dates.

7. A method for controlling a computerized organizer as recited in claim 6 wherein said moving includes updating a time and date associated with said temporal-based entry.

8. A method for controlling a computerized organizer as recited in claim 1 wherein said step of moving includes moving said temporal-based entry from a temporal-based note area to a temporal-based scheduler area.

9. A method for controlling a computerized organizer as recited in claim 8 wherein said step of moving includes updating a time associated with said temporal-based entry.

10. A method for controlling a computerized organizer as recited in claim 1 wherein said step of moving includes moving said temporal-based entry from a temporal-based scheduler area to a temporal-based note area.

11. A method for controlling a computerized organizer as recited in claim 10 wherein said step of moving includes removing a time associated with said temporal-based entry.

12. A method for controlling a computerized organizer as recited in claim 1 wherein said step of activating includes activating a temporal-based note area and a temporal-based to-do list area.

13. A method for controlling a computerized organizer as recited in claim 12 wherein said temporal-based entry is moved within said temporal-based to-do list area.

14. A method for controlling a computerized organizer as recited in claim 12 wherein said step of activating includes displaying a plurality of dates in said temporal-based to-do list area.

15. A method for controlling a computerized organizer as recited in claim 14 wherein said temporal-based entry is moved between said plurality of dates.

16. A method for controlling a computerized organizer as recited in claim 15 wherein said moving includes updating a date associated with said temporal-based entry.

17. A method for controlling a computerized organizer as recited in claim 1 wherein step of moving includes moving said temporal-based entry from a temporal-based note area to a temporal-based to-do list area.

18. A method for controlling a computerized organizer as recited in claim 1 wherein said step of moving includes moving said temporal-based entry from a temporal-based to-do list area to a temporal-based note area.

19. A method for controlling a computerized organizer as recited in claim 1 wherein said step of editing comprises editing the content of said temporal-based entry.

20. A method for controlling a computerized organizer as recited in claim 1 wherein said step of editing comprises editing from an edit window.

21. A method for controlling a computerized organizer as recited in claim 1 wherein said step of editing comprises editing a duration bar of said temporal-based entry.

22. A method for controlling a computerized organizer as recited in claim 21 wherein said step of editing further comprises resizing said duration bar to alter a stop time and a duration of said temporal-based entry.

23. A method for moving temporal-based entries in a computerized organizer having a screen and a pointer mechanism, said method comprising the steps of:

selecting a temporal-based object with a pointer mechanism of a computerized organizer, said computerized including a computer-implemented process which supports a plurality of non-modal temporal-based functions including a scheduler, a to-do list and a note function, wherein said scheduler includes an appointment area and an annotation area, said appointment area and said annotation area being separated by an invisible margin such that temporal-based objects corresponding to annotations in said annotation area that are moved across said invisible margin to said appointment area are transformed into temporal-based objects corresponding to appointments and temporal-based objects corresponding to appointments that are moved across said invisible margin into said annotation area are transformed into temporal-based objects corresponding to annotations;

dragging said temporal-based object at least partially across a screen of said computerized organizer;

releasing said temporal-based object at a new position on said screen; and updating a temporal value associated with said temporal-based object to reflect said position.

24. A method for moving temporal-based entries as recited in claim 23 wherein said temporal value is selected from the group including a start time, a stop time, and a date stamp.

25. A method for moving temporal-based entries as recited in claim 24 wherein said temporal value stored in said date stamp includes a month value, a day value, and a year value.

26. A method for moving temporal-based entries as recited in claim 23 further comprising displaying at least one day of a temporal-based scheduler, said temporal-based scheduler having a plurality of appointment times.

27. A method for moving temporal-based entries as recited in claim 26 further comprising dragging said temporal-based object between said appointment times within one day of said temporal-based scheduler.

28. A method for moving a temporal-based entries as recited in claim 26 further comprising dragging said temporal-based object between days of said temporal-based scheduler.

29. A method for moving temporal-based entries as recited in claim 23 further comprising displaying at least one day of a temporal-based to-do list.

30. A method for moving temporal-based entries as recited in claim 29 further comprising dragging said temporal-based object within one day of said temporal-based to-do list area.

31. A method for moving temporal-based entries as recited in claim 29 further comprising dragging said temporal-based object between days of said temporal-based to-do list.

* * * * *

UNITED STATES PATENT AND TRADEMARK OFFICE
CERTIFICATE OF CORRECTION

PATENT NO. : 5,457,476
DATED : October 10, 1995
INVENTOR(S) : Scott A. Jenson

It is certified that error appears in the above-indentified patent and that said Letters Patent is hereby corrected as shown below:

Column 14, line 46, replace "non-model" with --non-modal--

Column 14, line 57, replace "margins" with --margin--

Column 14, line 60, replace "within one said" with --within one of said--

Column 16, line 33, replace "to reflect said position" with --to reflect said new position--

Signed and Sealed this

Twenty-sixth Day of December, 1995

*Attest:*

BRUCE LEHMAN

*Attesting Officer*  *Commissioner of Patents and Trademarks*